United States Patent
Ma et al.

(10) Patent No.: US 11,855,918 B2
(45) Date of Patent: Dec. 26, 2023

(54) FLEXIBLE FRAME STRUCTURE FOR WIRELESS COMMUNICATION

(71) Applicants: Jianglei Ma, Ottawa (CA); Peiying Zhu, Ottawa (CA); Wen Tong, Ottawa (CA); Ming Jia, Ottawa (CA)

(72) Inventors: Jianglei Ma, Ottawa (CA); Peiying Zhu, Ottawa (CA); Wen Tong, Ottawa (CA); Ming Jia, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 281 days.

(21) Appl. No.: 16/887,361

(22) Filed: May 29, 2020

(65) Prior Publication Data

US 2021/0160111 A1 May 27, 2021

Related U.S. Application Data

(60) Provisional application No. 62/939,207, filed on Nov. 22, 2019.

(51) Int. Cl.
*H04L 5/00* (2006.01)
*H04L 27/26* (2006.01)

(52) U.S. Cl.
CPC ........ *H04L 5/0044* (2013.01); *H04L 27/2628* (2013.01)

(58) Field of Classification Search
CPC .......................... H04L 27/2628; H04L 5/0044
USPC ........................................................ 375/260
See application file for complete search history.

(56) References Cited

U.S. PATENT DOCUMENTS

| | | | |
|---|---|---|---|
| 2002/0154686 A1* | 10/2002 | Ginesi | H04L 27/2666 375/222 |
| 2016/0353436 A1 | 12/2016 | Au et al. | |
| 2017/0201357 A1* | 7/2017 | Choi | H04L 27/2605 |
| 2018/0359123 A1 | 12/2018 | Kimura et al. | |
| 2019/0037549 A1* | 1/2019 | Xu | H04L 25/0224 |
| 2019/0110294 A1* | 4/2019 | Takaoka | H04J 4/005 |
| 2019/0215847 A1 | 7/2019 | Abdoli et al. | |

(Continued)

FOREIGN PATENT DOCUMENTS

| | | |
|---|---|---|
| CA | 2981184 A1 | 10/2016 |
| CN | 101438554 A | 5/2009 |
| EP | 3484201 A1 | 5/2019 |

(Continued)

OTHER PUBLICATIONS

Huawei et al.,"Overview of 5G frame structure", 3GPP TSG RAN WG1 Meeting #84bis R1-162157, Busan, Korea, Apr. 11-15, 2016, 6 pages.

*Primary Examiner* — Fitwi Y Hailegiorgis

(57) ABSTRACT

Current radio frame structures in Long-Term Evolution (LTE) and New Radio (NR) have some restrictions. A frame structure is disclosed herein that aims to provide more flexibility. Embodiments of the flexible frame structure include different parameters that are flexible, i.e. that are configurable. A non-exhaustive list of parameters that may be configurable include: length of the frame; length of a subframe (if a subframe is even defined); length of a slot and/or number of symbol blocks in a slot (if a slot is even defined); length of the CP and/or data portion in a symbol block, or ratio of CP to data portion, which may vary between symbol blocks; downlink/uplink switching gap length, etc.

22 Claims, 16 Drawing Sheets

(56) References Cited

U.S. PATENT DOCUMENTS

2020/0358569 A1* 11/2020 Zhang .................. H04L 5/0094
2021/0075661 A1   3/2021 Ferdinand et al.

FOREIGN PATENT DOCUMENTS

| JP | 2017525300 A  | 8/2017 |
| JP | 2018503990 A  | 2/2018 |
| JP | 2018524876 A  | 8/2018 |
| WO | 2016050870 A1 | 4/2016 |
| WO | 2019021574 A1 | 1/2019 |

* cited by examiner

FLEXIBLE FRAME STRUCTURE FOR WIRELESS COMMUNICATION

PRIORITY

The present application claims the benefit under 35 U.S.C § 119(e) of U.S. Provisional Patent Application Ser. No. 62/939,207, entitled "Flexible Frame Structure for Wireless Communication", which was filed on Nov. 22, 2019, and which is incorporated herein by reference.

FIELD

The present application relates to wireless communication, and more specifically to a frame structure for wireless communication.

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources.

Time-frequency resources are allocated for communications between UEs and a base station. Multiple access occurs when more than one UE is scheduled on a set of time-frequency resources. Each UE uses a portion of the time-frequency resources to receive data from the base station in the case of a downlink communication, or to transmit data to the base station in the case of an uplink communication.

A frame structure is a feature of the wireless communication physical layer that defines a time domain signal transmission structure, e.g. to allow for timing reference and timing alignment of basic time domain transmission units. Wireless communication between UEs and one or more base stations occur on time-frequency resources governed by a frame structure. The frame structure may sometimes instead be called a radio frame structure.

Current frame structures in Long-Term Evolution (LTE) and New Radio (NR) have some restrictions. For example, in the NR frame structure time domain granularity is limited by orthogonal frequency-division multiplexing (OFDM) symbol duration, and the frame structure is based on OFDM waveform parameters, such as subcarrier spacing and cyclic prefix (CP). The CP length is not flexible enough due to scalable numerology relation, the smallest time domain granularity is restricted by OFDM symbol duration, and there is possible resource waste due to restrictions such as: limited CP length options, length of time restrictions on the switching gap between uplink and downlink in time division duplex (TDD), length of time restrictions on automatic gain control (AGC) measurement duration, restrictions on bandwidth part (BWP) switching gap, etc.

SUMMARY

A frame structure is disclosed herein that aims to provide more flexibility compared to previous frame structures, e.g. compared to the frame structure in LTE and NR.

Embodiments of the flexible frame structure include different parameters that are flexible, i.e. that are configurable. A non-exhaustive list of parameters that may be configurable include: length of the frame; length of a subframe (if a subframe is even defined); length of a slot and/or number of symbol blocks in a slot (if a slot is even defined); length of the CP and/or data portion in a symbol block, or ratio of CP to data portion, which may vary between symbol blocks; downlink/uplink switching gap length, etc.

In some embodiments, a frame structure is provided in which any one or more of the following may be provided:
(1) OFDM symbol duration is not limited by fast fourier transform (FFT) size which is power of two. This means that the OFDM symbol duration does not need to be scalable by a power of two. In particular, in LTE and NR frame structures, an inverse FFT (IFFT) is used to implement the inverse discrete fourier transform (IDFT) when generating OFDM symbols. IFFT may be a relatively computationally efficient algorithm, but it has a limitation in that its size (i.e. number of output samples) is limited to a power of two, which means that the OFDM symbol duration is limited in the same way for a given sampling frequency. This places a restriction on OFDM symbol duration, which results in less flexibility in terms of OFDM symbol duration within a frame. In some embodiments of the flexible frame structure disclosed herein, the OFDM symbol duration is not limited based on the IFFT restriction, and more generally the IDFT algorithm may be used to generate OFDM symbol durations of different lengths, possibly within the same frame. The benefit of increased flexibility offsets any potential increase in computational complexity in generating the OFDM symbol and/or any potential increase in signaling overhead.
(2) The number of OFDM symbols per basic time unit (such as per slot, per subframe, or per frame) is not limited by the ratio of the basic time unit and scalable OFDM symbol durations.
(3) CP length is not restricted by the scalable OFDM durations.
(4) The frame can include a flexibly configured single-carrier based symbol block length, including flexible CP configuration.
(5) Frame length is configurable.
(6) The hieratical time domain structure can be configurable (e.g. configurable frame length and/or configurable subframe length and/or configurable slot length).

Embodiments of the flexible frame structures disclosed herein may result in a potential increase in computational complexity (e.g. in generating the OFDM symbol) and/or a potential increase in signaling overhead. However, embodiments of the flexible frame structures disclosed herein may be suitable for use in a wide variety of application scenarios, e.g. autonomous vehicle communication, smart meters, device-to-device communication via a sidelink channel, delay tolerant communications, delay-sensitive (e.g. low latency) communications, etc. The flexibility may allow for a single frame structure to accommodate these different application scenarios, with multiple application scenarios possibly within a same frame. Use of a single flexible frame structure that may accommodate different application scenarios has been recognized by the inventors, and the inventors have discovered that this benefit outweighs potential increases in computational complexity and/or potential increases in signaling overhead.

In one embodiment, a method for wireless communication is provided that includes generating a first set of data symbols. Each data symbol of the first set of data symbols is on a respective different subcarrier frequency. The method may further include operating on the first set of data symbols using a first inverse discrete fourier transform (IDFT) to obtain a first data portion, and appending the first data portion to a first CP to obtain a first OFDM symbol. The method may further include transmitting the first OFDM symbol. The method may further include generating a second set of data symbols. Each data symbol of the second set of data symbols is on a respective different subcarrier frequency. The method may further include operating on the second set of data symbols using a second IDFT to obtain a second data portion, and appending the second data portion to a second CP to obtain a second OFDM symbol. The method may further include transmitting the second OFDM symbol. In some embodiments, the first IDFT has a first size and the second IDFT has a second size different from the first size. In some embodiments the first size might not be a power of two. In some embodiments, the second size might not be a power of two.

Note that "length" and "duration" (or "time duration") will be used interchangeably herein. The word "length" refers to length in the time domain, i.e. length in time.

Corresponding base stations and UEs are disclosed that may be configured to perform the methods described herein.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Example Communication Systems and Devices

Figure 1:
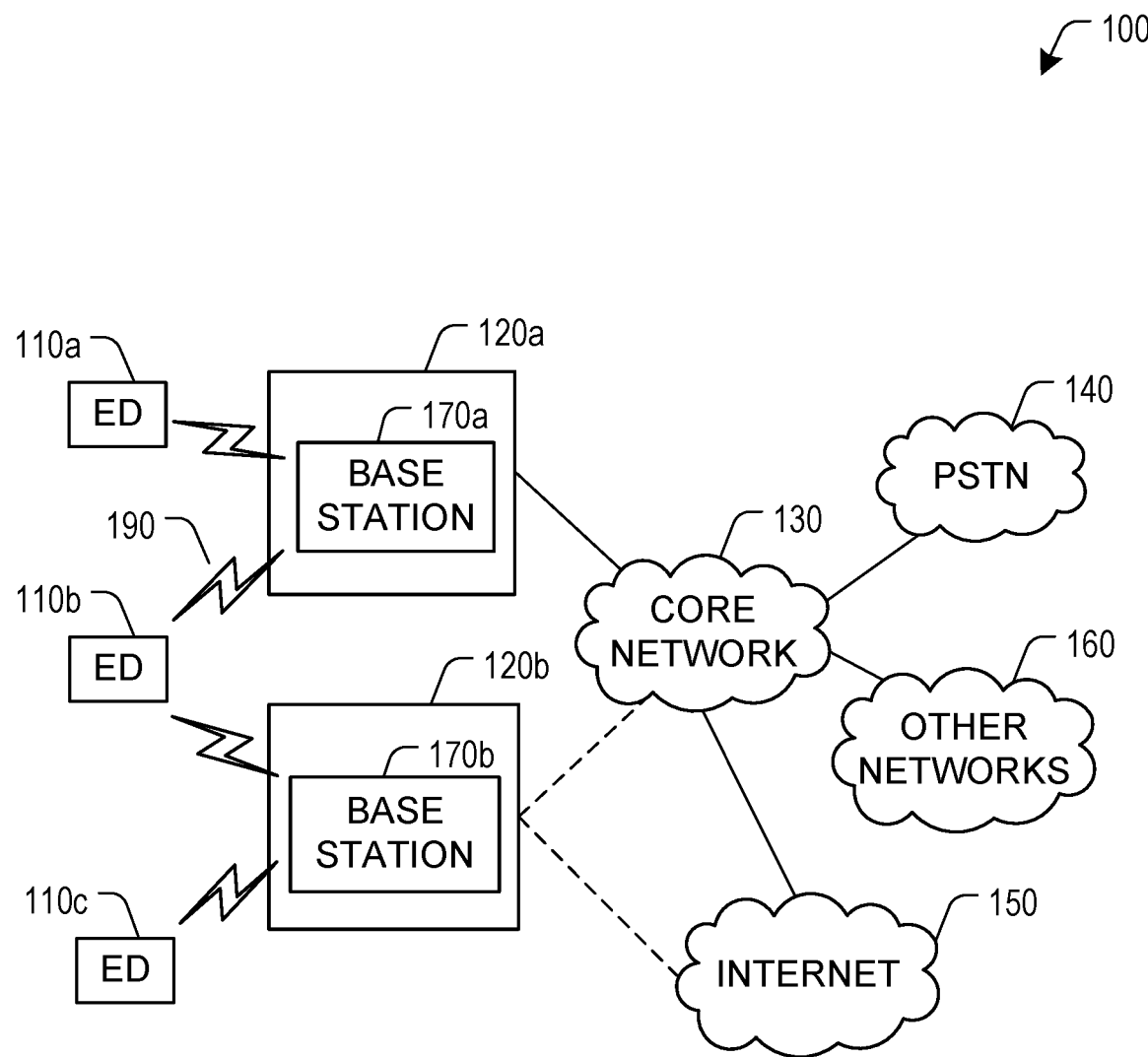
FIG. 1 is a network diagram of an example communication system.

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, multicast, unicast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, consumer electronics device, car, truck, bus, train, drone, etc.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2:
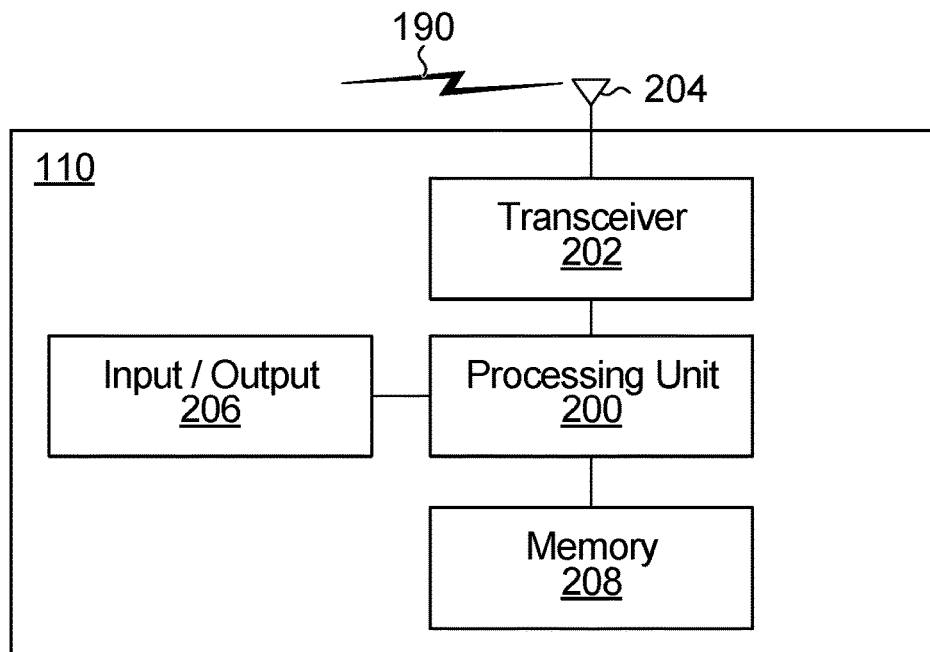
FIG. 2 is a block diagram of an example electronic device.
Figure 3:
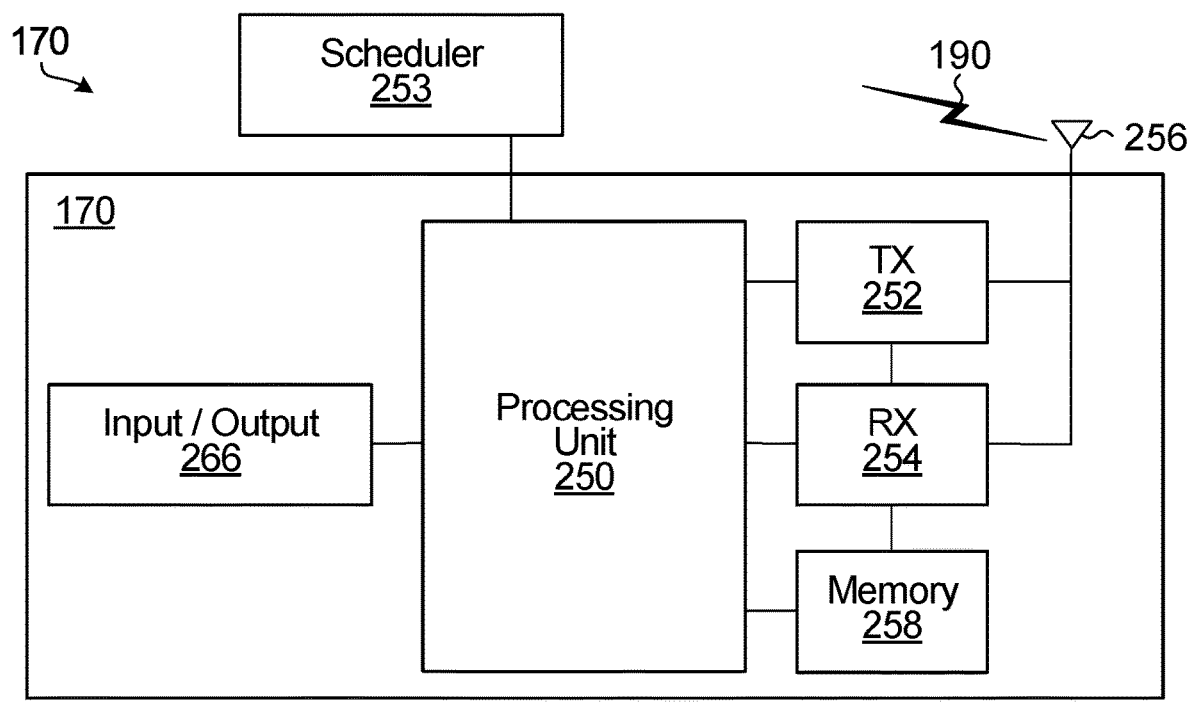
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
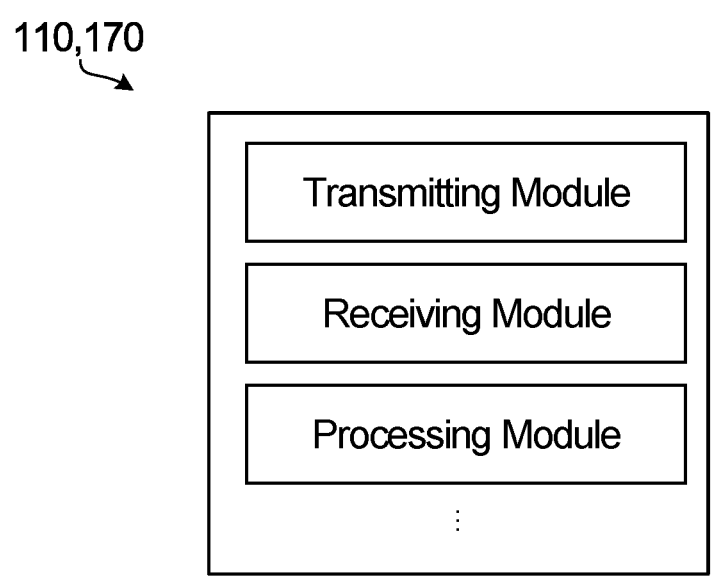
FIG. 4 is a block diagram of example component modules.

One or more steps of the embodiment methods provided herein may be performed by corresponding units or modules, according to FIG. 4. FIG. 4 illustrates units or modules in a device, such as in ED 110 or base station 170. For example, a signal may be transmitted by a transmitting unit or a transmitting module. A signal may be received by a receiving unit or a receiving module. A signal may be processed by a processing unit or a processing module. The processing module may encompass the units/modules described later, in particular the processor 210 or processor 260. Other units/modules may be included in FIG. 4, but are not shown. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Figure 5:
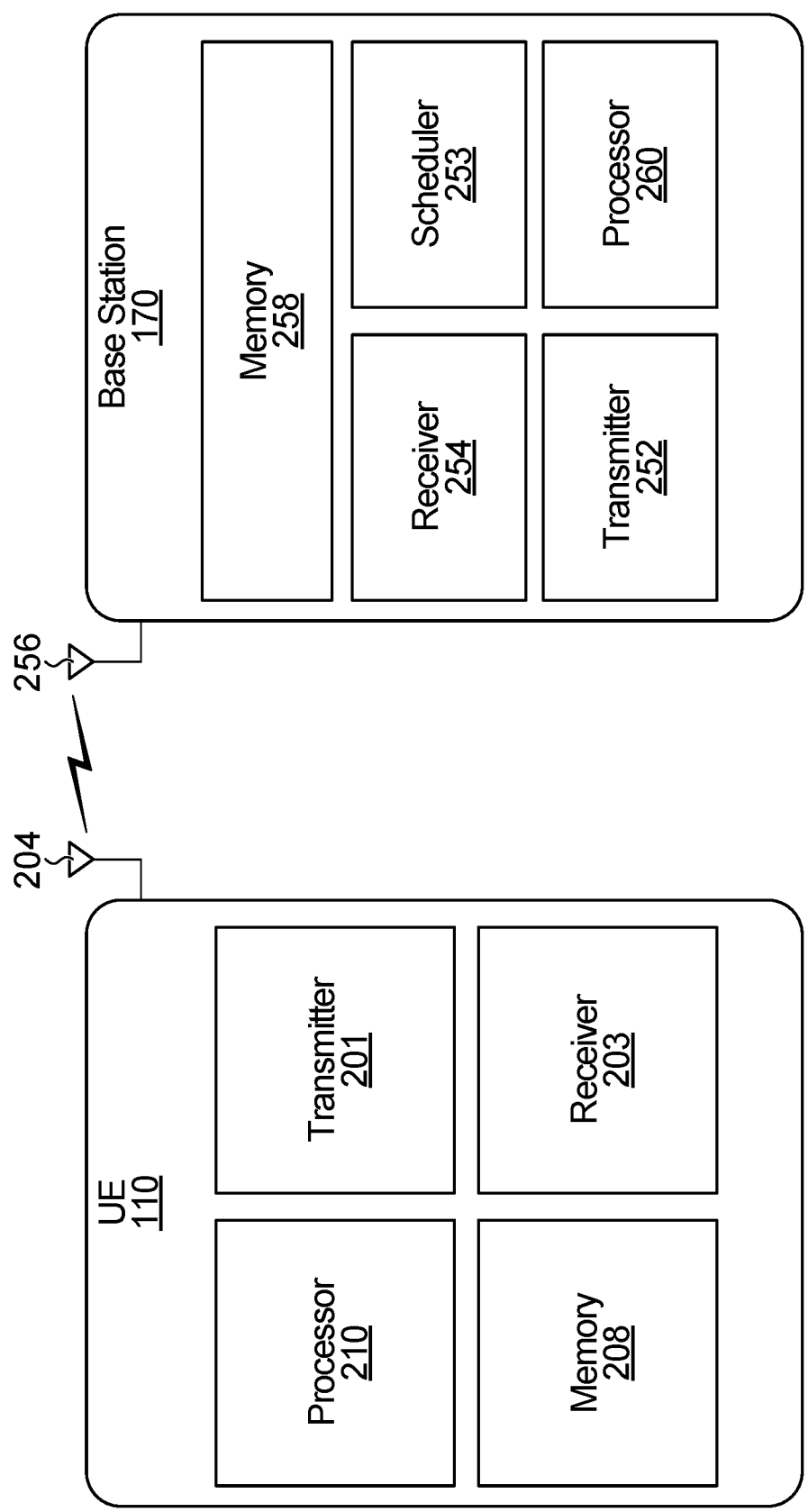
FIG. 5 is a block diagram of an example user equipment and base station.

FIG. 5 illustrates another example of an ED 110 and a base station 170. The ED 110 will hereafter be referred to as a user equipment (UE) 110.

The base station 170 may be called other names in some implementations, such as a transmit and receive point (TRP), a base transceiver station, a radio base station, a network node, a transmit/receive node, a Node B, an evolved NodeB (eNodeB or eNB), a gNB, a relay station, or a remote radio head. In some embodiments, the parts of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource allocation (scheduling), message generation, and encoding/decoding, and that are not necessarily part of the equipment housing the antennas of the base station 170. The modules may also be coupled to other base stations. In some embodiments, the base station 170 may actually be a plurality of base stations that are operating together to serve the UE 110, e.g. through coordinated multipoint transmissions.

The base station 170 includes a transmitter 252 and a receiver 254 coupled to one or more antennas 256. Only one antenna 256 is illustrated. The transmitter 252 and the receiver 254 may be integrated as a transceiver. The base station 170 further includes a processor 260 for performing operations including those related to preparing a transmission for downlink transmission to the UE 110, and those related to processing uplink transmissions received from the UE 110. Processing operations related to preparing a transmission for downlink transmission include operations such as encoding, modulating, precoding (e.g. MIMO precoding), and generating the symbol blocks described herein. Processing operations related to processing uplink transmissions include demodulating, decoding, and extracting the symbol blocks described herein. The processor 260 may configure the parameters of the flexible frame structure (e.g. subframe length etc.) and generate signaling to indicate the parameters to the UE 110. The signaling is then sent by the transmitter 252. The base station 170 further includes a scheduler 253, which may schedule the uplink resources in a frame to be allocated to UE 110 for uplink transmissions, and which may also schedule downlink transmissions in a frame. The frame may be any of the flexible frame structures described herein. The base station 100 further includes a memory 258 for storing information and data.

Although not illustrated, the processor 260 may form part of the transmitter 252 and/or receiver 254. Also, although not illustrated, the processor 260 may implement the scheduler 253.

The processor 260, the scheduler 253, and the processing components of the transmitter 252 and receiver 254 may each be implemented by the same or different one or more processors that are configured to execute instructions stored in a memory (e.g. in memory 258). Alternatively, some or all of the processor 260, the scheduler 253, and the processing components of the transmitter 252 and receiver 254 may be implemented using dedicated circuitry, such as a programmed field-programmable gate array (FPGA), a graphical processing unit (GPU), or an application-specific integrated circuit (ASIC).

The UE 110 also includes a transmitter 201 and a receiver 203 coupled to one or more antennas 204. Only one antenna 204 is illustrated. The transmitter 201 and the receiver 203 may be integrated as a transceiver, e.g. transceiver 202 of FIG. 2. The UE 110 further includes a processor 210 for performing operations including those related to preparing a transmission for uplink transmission to the base station 170, and those related to processing downlink transmissions received from the base station 170. Processing operations related to preparing a transmission for uplink transmission include operations such as encoding, modulating, and generating the symbol blocks described herein. Processing operations related to processing downlink transmissions include demodulating, decoding, and extracting the symbol blocks described herein. The processor 210 may extract signaling from a downlink transmission (e.g. by decoding the signaling) in order to determine parameters of a flexible frame (e.g. in order to determine subframe length, etc.). The base station 100 further includes a memory 208 for storing information and data.

Although not illustrated, the processor 210 may form part of the transmitter 201 and/or receiver 203.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a FPGA, a GPU, or an ASIC.

The base station 170 and the UE 110 may include other components, but these have been omitted for the sake of clarity.

Frame Structure

A frame structure defines a time domain signal transmission structure, e.g. to allow for timing reference and timing alignment of basic time domain transmission units. Wireless communication between UEs and one or more base stations occur on time-frequency resources governed by a frame structure.

Figure 6:
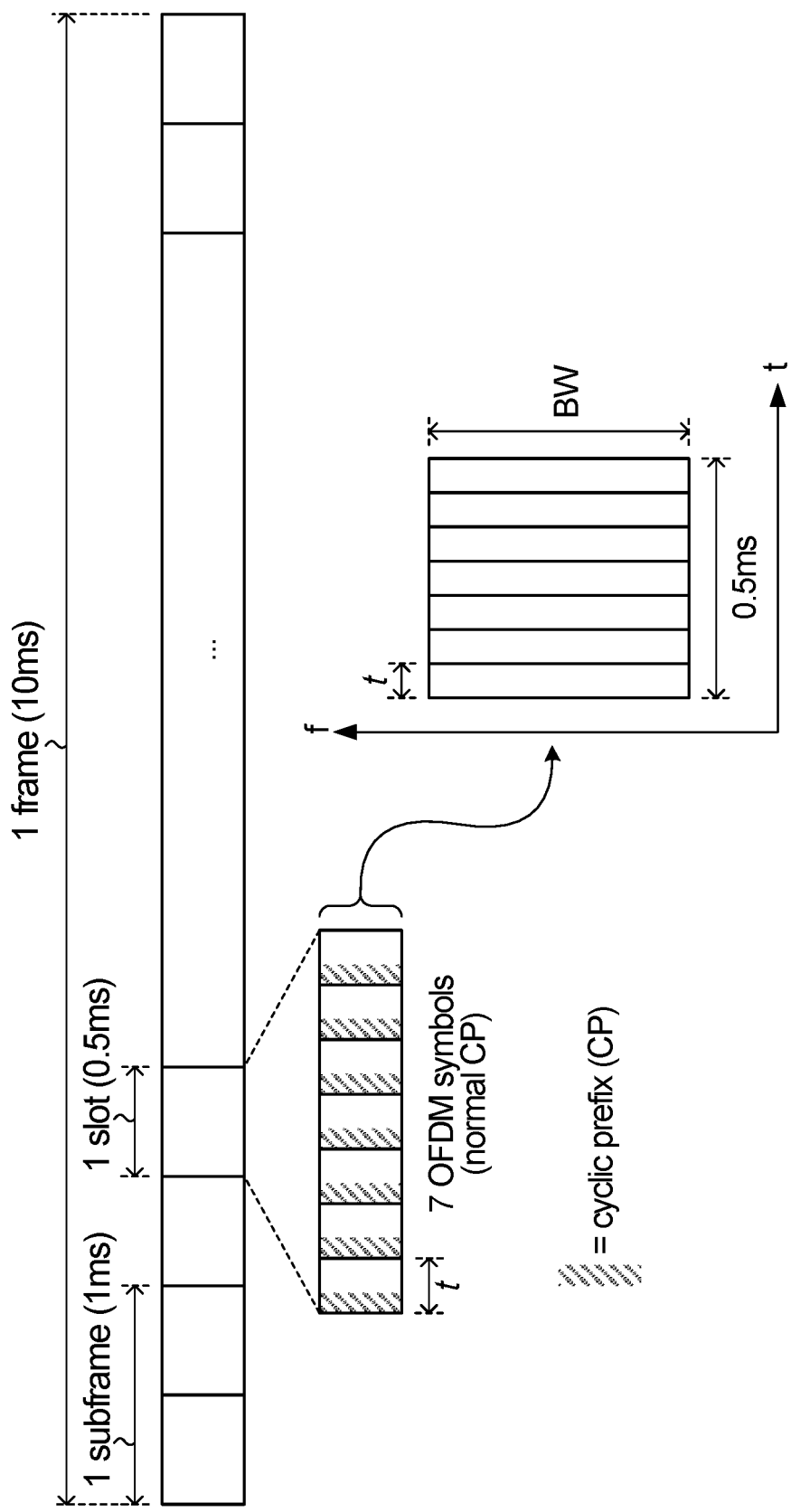
FIG. 6 illustrates an example frame structure in LTE.

One example of a frame structure is illustrated in FIG. 6. The frame structure in FIG. 6 is one example type of frame structure in LTE. The frame structure in FIG. 6 has the following structure: each frame is 10 ms in duration; each frame has 10 subframes, which are each 1 ms in duration; each subframe includes two slots, each of which is 0.5 ms in duration; each slot is for transmission of 7 OFDM symbols (assuming normal CP); each OFDM symbol has a symbol duration t and a particular bandwidth (or partial bandwidth or bandwidth partition) related to the number of subcarriers and subcarrier spacing. The frame structure of FIG. 6 places limitations on time domain scheduling and duration, e.g. scheduling is on a subframe basis, the frame structure is based on OFDM waveform parameters such as subcarrier spacing and CP length (where the CP has a fixed length or limited length options), the switching gap between uplink and downlink in TDD has to be the integer time of OFDM symbol duration, etc.

Figure 7:
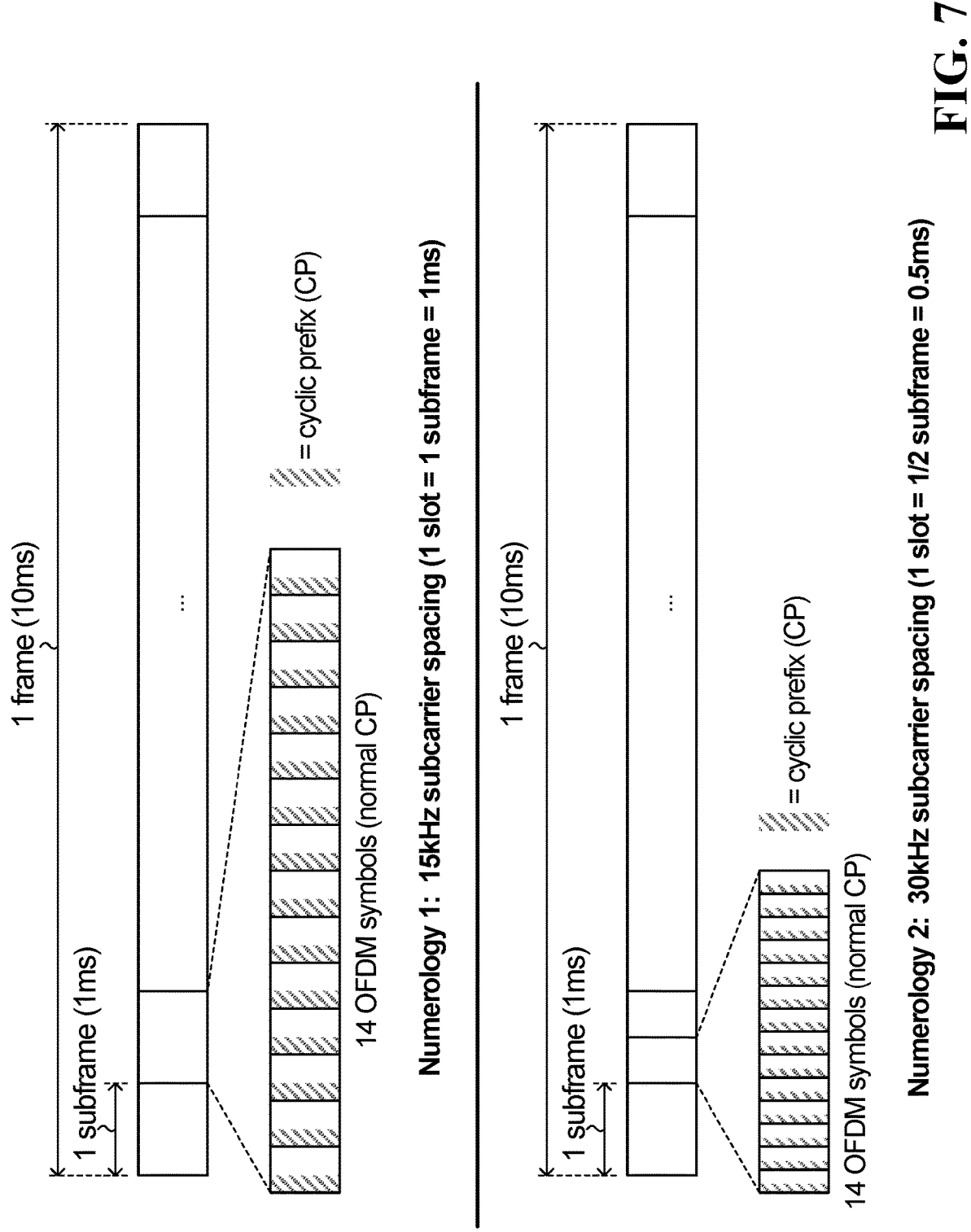
FIG. 7 illustrates an example frame structure in NR.

Another example of a frame structure is that defined in NR. In NR, multiple subcarrier spacings are supported, each subcarrier spacing corresponding to a respective numerology. The frame structure depends on the numerology, but in any case the frame length is set at 10 ms, and consists of ten subframes of 1 ms each. A slot is defined as 14 OFDM symbols, and slot length depends upon the numerology. For example, FIG. 7 illustrates the NR frame structure for normal CP 15 kHz subcarrier spacing ("numerology 1") and the NR frame structure for normal CP 30 kHz subcarrier spacing ("numerology 2"). For 15 kHz subcarrier spacing a slot length is 1 ms, and for 30 kHz subcarrier spacing a slot length is 0.5 ms.

The NR frame structure may have more flexibility than the LTE frame structure, but the NR frame structure still places notable limitations on time domain scheduling and duration. For example, time domain granularity is limited by OFDM symbol duration, the frame structure is based on OFDM waveform parameters, such as subcarrier spacing and CP, the CP length is not flexible enough due to scalable numerology relation, and there is possible resource waste due to restrictions such as: limited CP length options, length of time restrictions on the switching gap between uplink and downlink in TDD, length of time restrictions on AGC measurement duration, restrictions on BWP switching gap, etc.

In particular, the following limitations are typically part of the NR frame structure: slots are defined as being 14 OFDM symbols with normal CP or 12 OFDM symbols with extended CP (with only 60 KHz subcarrier spacing supporting normal CP and extended CP); OFDM symbol is the smallest (finest granularity) transmission time unit, e.g. the minimum time duration that can be reserved is limited to one OFDM symbol (or a multiple of OFDM symbols); the actual time duration (i.e. length) of OFDM symbol is scalable (inversely scaled) with pre-defined subcarrier spacing options (15 kHz, 30 kHz, 60 kHz, etc.); each OFDM symbol has a CP part and a useful (data) part; a subframe is defined as 1 ms, and a frame is defined as 10 subframes (i.e. 10 ms); minimum duration of the switching gap between uplink and downlink has to be at least one OFDM symbol duration; etc.

Instead of the LTE or NR frame structure, another frame structure is disclosed below that aims to provide more flexibility. This frame structure will be referred to herein as a "flexible frame structure".

However, before describing embodiments of the flexible frame structure, the concept of single carrier waveform and multi-carrier waveform symbol blocks will first be described.

Symbol Blocks

A symbol block is the minimum duration of time that may be scheduled in the flexible frame structure described below. A symbol block is a unit of transmission having an optional redundancy portion (e.g. CP portion) and a data portion. An OFDM symbol is an example of a symbol block. However, more generally a symbol block does not have to be an OFDM symbol or even based on a multi-carrier waveform.

Figure 8:
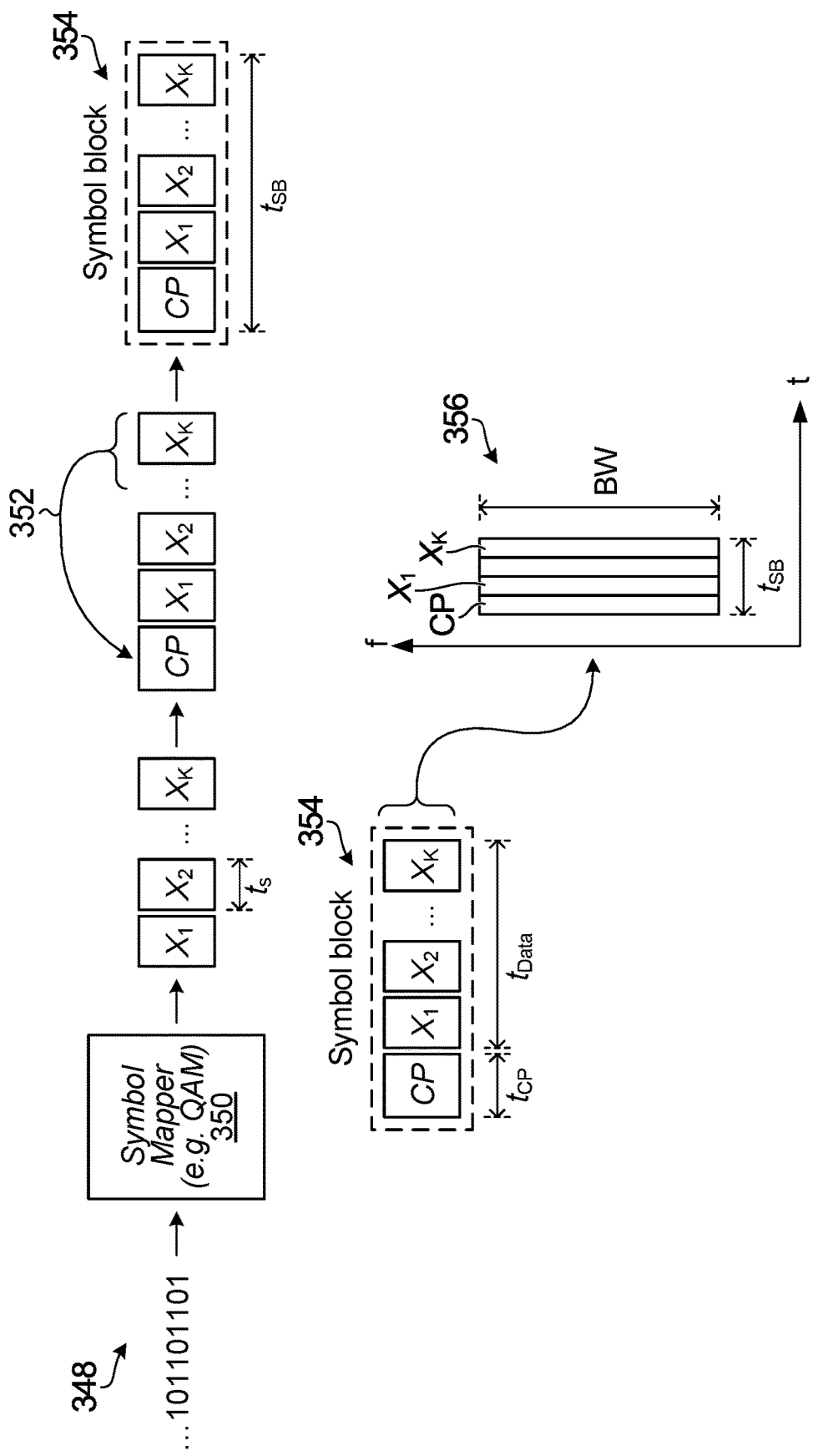
FIG. 8 illustrates generation of a single-carrier symbol block, according to one embodiment.

FIG. 8 illustrates generation of a single-carrier symbol block, according to one embodiment. A plurality of bits 348 are mapped by a symbol mapper 350 to one or more data symbols $X_1$ to $X_K$. K is a natural number greater or equal to one. Each data symbol has a symbol duration $t_s$. The symbol mapper 350 may be implemented by a modulator (e.g. by processor 210 or 260). One example type of modulation that may be implemented by the symbol mapper 350 is quadrature amplitude modulation (QAM), in which case each one of the one or more data symbols $X_1$ to $X_K$ is a QAM or offset QAM (OQAM) symbol that carries two or more bits of the plurality of bits 348, depending upon the constellation order. A CP is added in front of the one or more data symbols $X_1$ to $X_K$, as shown at 352, e.g. to assist with equalization in the frequency domain. The content of the CP may be a repeat of one or some of the data symbol content, e.g. a repeat of one or more data symbols present at the end of the symbol block, as shown at 352, in which case the symbols carrying the CP may be called "CP symbols". A symbol block 354 is thereby generated that includes the CP and the K data symbols, e.g. with the CP at the start of the symbol block 354, as illustrated. The CP portion has duration $t_{CP}$, and the data portion has duration $t_{Data}$, which together make up the symbol block 354 duration $t_{SB}=t_{CP}+t_{Data}$. The symbol block 354 is transmitted over a particular bandwidth (or partial bandwidth or bandwidth partition), as shown at 356. The symbol block 354 may be transmitted in the uplink or the downlink. The components illustrated and operations described in relation to FIG. 8 may be implemented by processor 210 if the symbol block 354 is an uplink transmission sent by the UE 110, or may be implemented by processor 260 if the symbol block 354 is a downlink transmission sent by the base station 170.

In FIG. 8, the symbol block 354 is a single-carrier symbol block transmitted in a certain bandwidth part, i.e. a single-carrier waveform is used. That is, the CP and data symbols are all transmitted on the same single frequency, one after the other in time, as illustrated in FIG. 8. The duration of the single-carrier symbol block 354 may be configurable, e.g. by configuring the CP length ($t_{CP}$) and/or by configuring the number of data symbols K (which impacts $t_{Data}$). In some embodiments, CP length and/or K may change from one symbol block to another or from one group of symbol blocks to another group of symbol blocks.

The single-carrier symbol block 354 described above in relation to FIG. 8 includes a CP. Alternatively, a CP can be omitted from a single-carrier symbol block 354, i.e. $t_{CP}=0$. In remaining figures in which a single-carrier symbol block is illustrated, a CP of non-zero duration will typically be illustrated, but the CP does not actually have to be included, depending upon the implementation.

Figure 9:
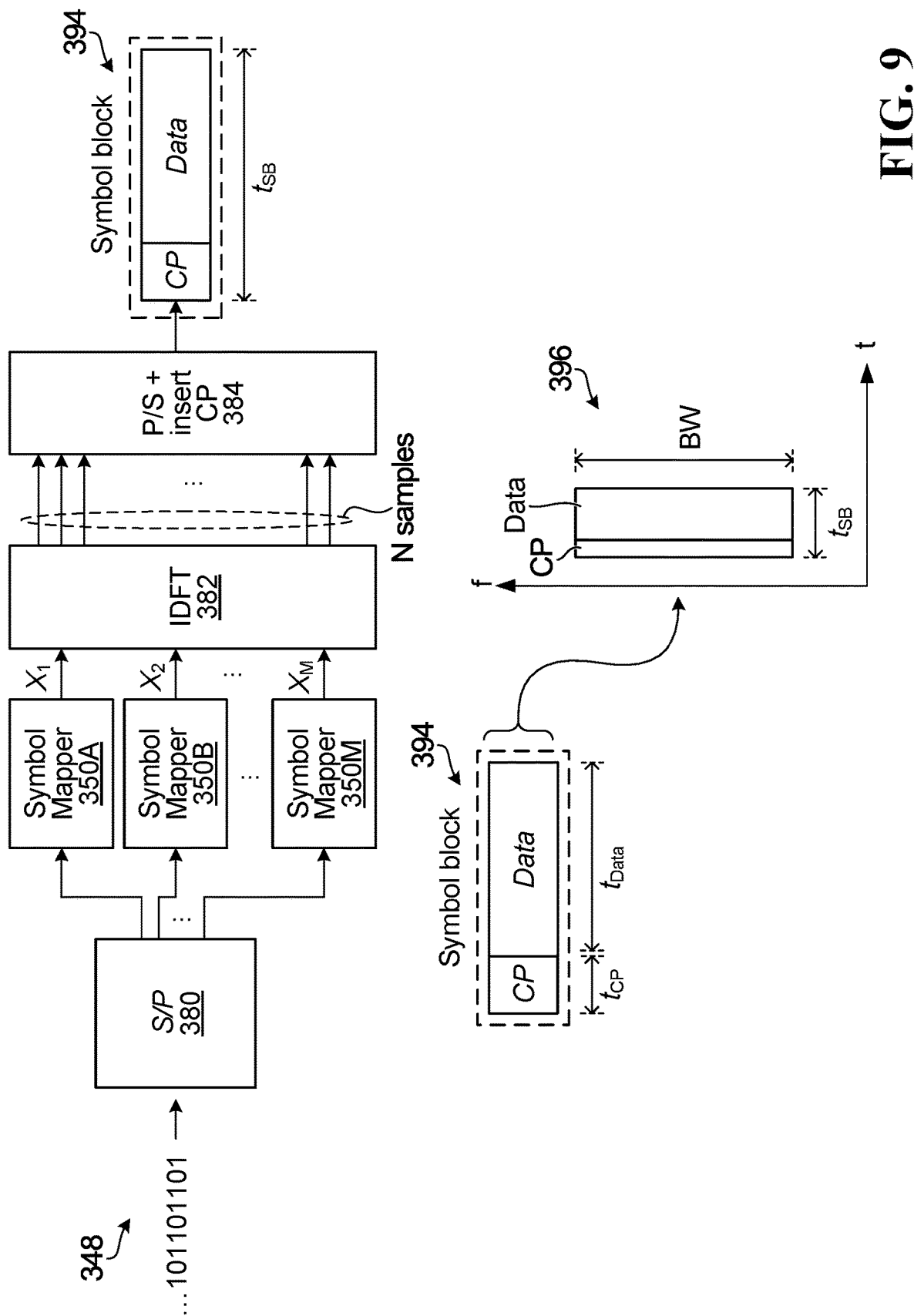
FIG. 9 illustrates generation of a multi-carrier symbol block, according to one embodiment.

FIG. 9 illustrates generation of a multi-carrier symbol block, according to one embodiment. A plurality of bits 348 undergo serial-to-parallel conversion in serial-to-parallel convertor 380 to result in M parallel bit streams, where M is a natural number greater than one. Each parallel bit stream is mapped by a respective symbol mapper 350A-M to result in M data symbols $X_1$ to $X_M$. Each symbol mapper 350A-M may be implemented by a modulator (e.g. by processor 210 or 260). One example type of modulation that may be implemented by one or more of the symbol mappers 350A-M is QAM, in which case the resulting data symbol is a QAM or OQAM symbol that carries two or more bits, depending upon the constellation order. Each data symbol $X_1$ to $X_M$ is for transmission on a respective different carrier frequency (i.e. subcarrier), and the subcarriers have a particular subcarrier spacing. The data symbols $X_1$ to $X_M$ undergo the inverse discrete fourier transform (IDFT) 382 (which may be implemented as an inverse fast fourier transform (IFFT) in some embodiments) to result in N time-domain sample outputs, where N is a natural number typically greater than M, followed by parallel-to-serial conversion and CP insertion. A symbol block 394 is thereby generated that includes a redundancy (e.g. CP) portion, and a data portion. The CP portion has duration $t_{CP}$ (also called CP length), and the data portion has duration $t_{Data}$, which together make up the symbol block 394 duration $t_{SB}=t_{CP}+t_{Data}$. The CP portion may be a repeat of some of the data portion, e.g. a repeat of the data portion present at the end of the symbol block 394. The CP portion may be present at the start of the symbol block 394, as illustrated. The data portion of the symbol block 394 transmits the data symbols $X_1$ to $X_M$ all in parallel on M different subcarriers having a particular subcarrier spacing. The symbol block 394 is transmitted over a particular bandwidth (or partial bandwidth or bandwidth partition), as shown at 396. The bandwidth is dependent upon the subcarrier spacing and the number of subcarriers used, which may occupy part of a designated bandwidth (or bandwidth partition) or a carrier. The symbol block 394 may be transmitted in the uplink or the downlink. The components illustrated and operations described in relation to FIG. 9 may be implemented by processor 210 if the symbol block 394 is an uplink transmission sent by the UE 110, or may be implemented by processor 260 if the symbol block 394 is a downlink transmission sent by the base station 170. Note that in a variation of FIG. 9 the serial-to-parallel convertor 380 may instead be placed after (downstream of) the symbol mappers, in which case the number of symbol mappers may be 1 or M, depending upon the implementation.

In FIG. 9, the symbol block 394 is multi-carrier, i.e. a multi-carrier waveform is used. That is, the CP and data symbols are transmitted on multiple subcarriers, with the data symbols being transmitted in parallel on the multiple subcarriers during the data duration $t_{Data}$.

One example of a multi-carrier symbol block is an OFDM symbol. Examples of applications that may utilize a multi-carrier waveform based on OFDM include orthogonal frequency-division multiple access (OFDMA) and single-carrier FDMA (SC-FDMA).

The size of the IDFT 382 refers to the number of output samples N of the IDFT 382. The size of the IDFT 382 affects the length of the symbol block 394 for a given sampling frequency. In particular, the larger the size of the IDFT 382 (i.e. the larger N), the longer the duration $t_{SB}$ of the symbol block 394 because there are more output samples to be transmitted. The size of the IDFT 382 also directly impacts the number of data symbols (M) that can be transmitted in an OFDM symbol and the subcarrier spacing, assuming the bandwidth over which the OFDM symbol is fixed. A smaller IDFT size N means that fewer data symbols can be transmitted in the OFDM symbol, which means the subcarrier spacing is farther apart because fewer subcarriers are being used over the same bandwidth. For example, assume N=1024, M=600, and the subcarrier spacing is 15 kHz. If the IDFT size N is then reduced to N=512, then M=300, which means that half the data symbols are transmitted in the OFDM symbol. If the bandwidth remains the same, then the subcarrier spacing is therefore twice as far apart (to spread the 300 data symbols over the same frequency range as the original 600 data symbols), i.e. the subcarrier spacing is set as 30 kHz.

In some embodiments, the IDFT 382 in FIG. 9 is implemented as an IFFT. However, an IFFT imposes a power-of-two restriction on the IDFT 382 size, i.e. the IDFT 382 size N is a power of two (e.g. N is 512 or 1024 or 2048, etc.). Therefore, an IFFT also imposes a restriction on OFDM symbol length $t_{SB}$ and subcarrier spacing. Scaling can only be on a factor-of-two basis (e.g. subcarrier spacing may be 15 kHz or 30 kHz but not in between, and OFDM symbol duration also scales based on this restriction). More generally the power-of-two restriction on IFFT may not be desirable, and therefore IFFT is not necessarily used, e.g. if it is desired to generate an OFDM symbol of a certain duration that cannot be obtained using the IFFT. Also, more generally, the multi-carrier waveform carrying the symbol block need not be generated using IDFT, but may be generated in the time domain using another time domain approach. For example, a time-domain pulse may be pre-generated based on the subband occupied by the transmitter. A time domain signal, which will be transmitted at a certain rate, can then be generated by convolving the base-band symbol (e.g. QAM) sequence with the pre-generated time-domain pulse.

The duration of the symbol block 394 may be configurable, as described below, by configuring the CP length ($t_{CP}$) and/or by configuring the IDFT size N. In some embodiments, CP length and/or IDFT size may change from one symbol block to another or from one group of symbol blocks to another group of symbol blocks.

It will be noted that the time duration of a QAM based single-carrier waveform-based symbol is much shorter than a multi-carrier (for example OFDM) symbol duration. For example, in FIG. 8 a symbol, such as data symbol $X_1$, has a duration that is a fraction of $t_{SB}$, whereas in FIG. 9 a symbol has a duration equal to $t_{SB}$. This is because in a multi-carrier waveform a "symbol" (e.g. an OFDM symbol) is equal to a symbol block in length because data is transmitted on subcarriers in parallel, whereas in a single-carrier waveform a symbol block consists of a plurality of symbols transmitted one after the other, all within the symbol block duration.

Any modulation scheme may be implemented by symbol mapper 350 of FIG. 8 (in the case of a single-carrier waveform), or symbol mappers 350A-N of FIG. 9 (in the case of a multi-carrier waveform). If there are multiple symbol mappers, e.g. as in FIG. 9, then different symbol mappers may implement different modulation schemes. Example modulation schemes include BPSK, PSK, QAM, and offset QAM (OQAM). OQAM is described in U.S. patent application Ser. No. 16/567,122, which was filed on Sep. 11, 2019, and which is incorporated herein by reference. In U.S. patent application Ser. No. 16/567,122, a circular convolved single-carrier OQAM waveform is described. This is an example of a waveform that may be transmitted in a symbol block in the flexible frame structure disclosed herein.

Flexible Frame Structure

To address some of the limitations present in an LTE and/or NR frame structure, a flexible frame structure is disclosed herein. Embodiments of the flexible frame structure include different parameters that are configurable, e.g. frame length, subframe length, symbol block length, etc. A non-exhaustive list of possible configurable parameters in some embodiments of the flexible frame structure include:

(1) Multiple options of frame definition: The frame length need not be limited to 10 ms, and the frame length may be configurable and change over time. In some embodiments, each frame includes one or multiple downlink synchronization channels and/or one or multiple downlink broadcast channels, and each synchronization channel and/or broadcast channel may be transmitted in a different direction by different beamforming. A synchronization channel may be used by a UE to initially access the network, e.g. by the UE blindly detecting the synchronization channel, after which the UE then decodes the broadcast channel. In some embodiments, the length of the frame may be blindly detected by the UE through the synchronization search (e.g. based on the period of the synchronization channel), whereas in other embodiments the length of the frame is indicated by the broadcast channel. In some embodiments, the periodicity of the synchronization channel may control how quick initial access can occur: the shorter the periodicity of the synchronization channel the more often a UE will have an opportunity to perform initial access. When the length of the frame is associated with the periodicity of synchronization channel, the length of the frame controls how quick initial access can occur: the shorter the frame length the more often a UE will have an opportunity to perform initial access. For example, if initial access via a synchronization channel is possible once per frame, and if the frame length is 10 ms, then a UE will have the opportunity to initially access the network once every 10 ms. If the frame length is instead 1 ms, then a UE will have the opportunity to initially access the network once every 1 ms. Note that when the length of the frame is instead indicated by the broadcast channel, there might not be a mapping relationship between the length of the frame and the periodicity of synchronization channel. The frame length may be more than one possible value and configured based on the application scenario. For example, autonomous vehicles may require relatively fast initial access, in which case the frame length may be set as 5 ms for autonomous vehicle applications. As another example, smart meters on houses may not require fast initial access, in which case the frame length may be set as 20 ms for smart meter applications.

(2) Multiple options for subframe duration: A subframe may or may not be defined in the flexible frame structure, depending upon the implementation. For example, a frame may be defined to include slots, but no subframes. In frames in which a subframe is defined, e.g. for time domain alignment, then the duration of the subframe may be configurable. For example, a subframe may be configured to have a length of 0.1 ms or 0.2 ms or 0.5 ms or 1 ms or 2 ms or 5 ms, etc. In some embodiments, if a subframe is not needed in a particular scenario, then the subframe length may be defined to be the same as the frame length or not defined. In one embodiment, the subframe configuration is common to all UEs or a group of UEs. For this case, the subframe configuration information may be transmitted to UEs in a broadcast channel or common control channel(s), and a UE may obtain the subframe configuration information by decoding the broadcast channel or common control channel(s). In other embodiments, the subframe configuration may be UE specific, in which case the subframe configuration information may be transmitted in a UE-specific control channel, and a UE may obtain subframe configuration information by decoding the UE-specific control channel. The UE-specific control channel may be transmitted periodically or aperiodically. In general, the subframe configuration may be system common, base station common, UE group common, or UE specific.

(3) Flexible slot configuration: A slot may or may not be defined in the flexible frame structure, depending upon the implementation. In frames in which a slot is defined, then the definition of a slot (e.g. in time duration and/or in number of symbol blocks) may be configurable. In one embodiment, the slot configuration is common to all UEs or a group of UEs. For this case, the slot configuration information may be transmitted to UEs in a broadcast channel or common control channel(s), and a UE may obtain the slot configuration information by decoding the broadcast channel or common control channel(s). In other embodiments, the slot configuration may be UE specific, in which case the slot configuration information may be transmitted in a UE-specific control channel, and a UE may obtain slot configuration information by decoding the UE-specific control channel. The UE-specific control channel may be transmitted periodically or aperiodically. In some embodiments, the slot configuration signaling can be transmitted together with frame configuration signaling and/or subframe configuration signaling. In other embodiments, the slot configuration can be transmitted independently from the frame configuration signaling and/or subframe configuration signaling. In general, the slot configuration may be system common, base station common, UE group common, or UE specific.

(4) Flexible transmission duration of basic transmission unit: The basic transmission unit described herein is a symbol block, which in general includes a redundancy portion (referred to as the CP) and a data portion, although in some embodiments the CP may be omitted from the symbol block. The CP length may be flexible and configurable. The CP length ($t_{CP}$) may be fixed within a frame or flexible within a frame, and the CP length may possibly change from one frame to another, or from one group of frames to another group of frames, or from one subframe to another subframe, or from one slot to another slot, or dynamically from one scheduling to another scheduling. The data portion may be flexible and configurable. For example, the number of data symbols transmitted in the data portion of a symbol block (in the case of a single-carrier waveform) or the IDFT size and/or subcarrier spacing (in the case of a multi-carrier waveform) may be flexible and configurable. The duration of the data portion ($t_{Data}$) of the symbol block may be fixed within a frame or flexible within a frame, and the duration of the data portion may possibly change from one frame to another, or from one group of frames to another group of frames, or from one subframe to another subframe, or from one slot to another slot, or dynamically from one scheduling to another scheduling. Another possible parameter relating to a symbol block that may be defined is ratio of CP duration to data duration, e.g. in a single-carrier waveform the ratio of number of data symbols used for the CP compared to total number of data symbols transmitted in the symbol block. In some embodiments, when a multi-carrier waveform is being used to transmit the symbol block, the symbol block length and/or CP length in the symbol block does not need to be fixed according to one predefined subcarrier spacing. In view of the foregoing possible configurations, the symbol block length ($t_{SB}$) can therefore be adaptive. The symbol block length ($t_{SB}$) may be adjusted according to: channel condition (e.g. multi-path delay, Doppler); and/or latency requirement; and/or available time duration. As one example, the CP length may be increased based on a determination that the multi-path delay in the channel is higher than average, or based on a timing offset or timing synchronization requirement. As another example, a symbol block length may be adjusted to fit an available time duration in the frame. As another example, a longer symbol block length may be used to reduce pilot and CP overhead, except that in low latency applications a longer symbol block length may not be desirable, e.g. in a low latency application the data should be decoded sooner, which favours having a shorter symbol block length, but may result in higher pilot overhead.

(5) Flexible switch gap: A frame may include both a downlink portion for downlink transmissions from a base station, and an uplink portion for uplink transmissions from UEs. A gap is present between each uplink and downlink portion, which is referred to as a switching gap. The switching gap length (duration) may be configurable. A switching gap duration may be fixed within a frame or flexible within a frame, and a switching gap duration may possibly change from one frame to another, or from one group of frames to another group of frames, or from one subframe to another subframe, or from one slot to another slot, or dynamically from one scheduling to another scheduling.

Figure 10:
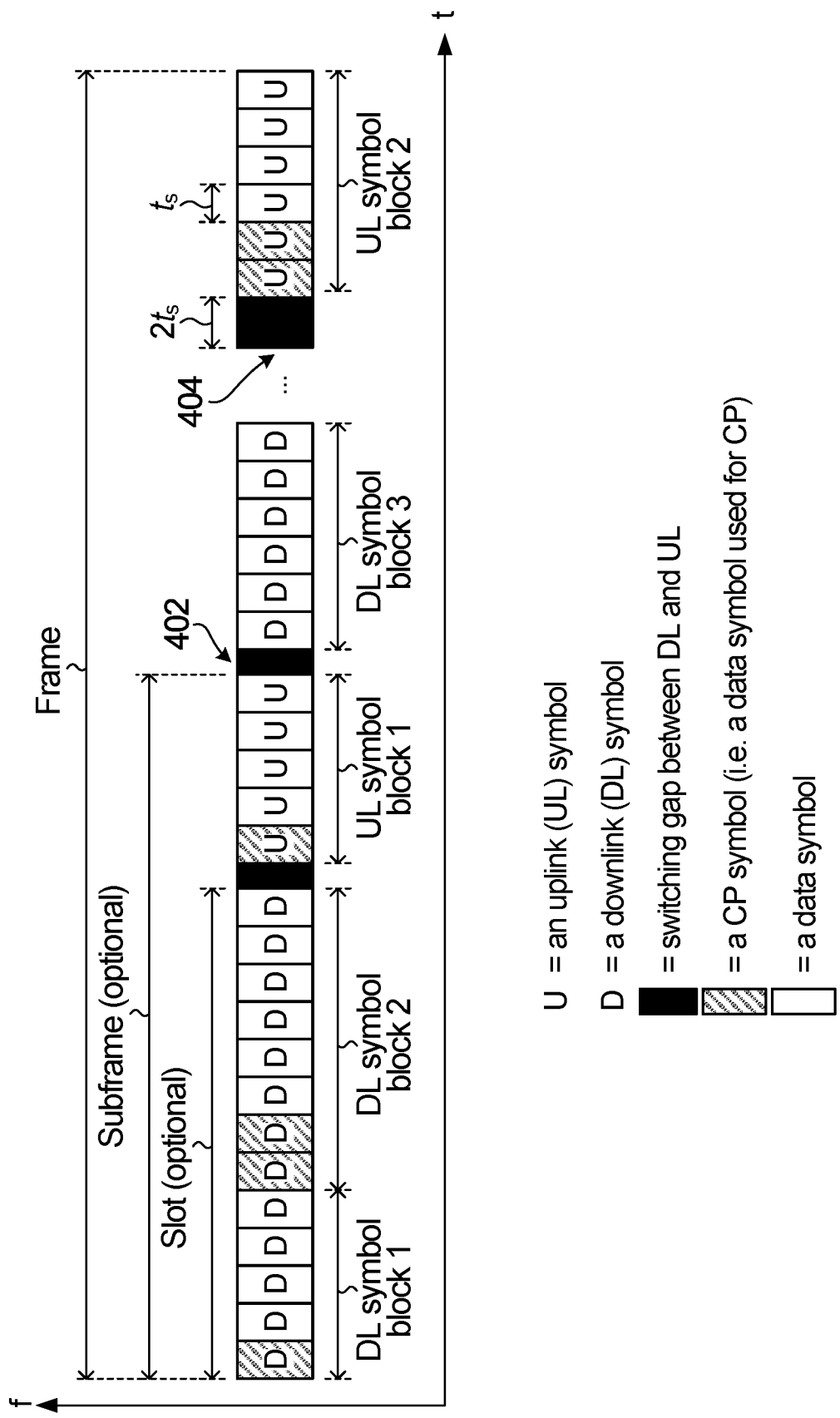
FIGS. 10 to 16 illustrate examples of flexible frame structures.

One example of a flexible frame structure based on a single-carrier waveform is illustrated in FIG. 10. Each symbol transmitted in the frame either carries data (a data symbol) or transmits all or part of a CP. A symbol transmitting all or part of a CP will be referred to as a CP symbol. A plurality of symbol blocks are scheduled in the frame. The frame includes downlink and uplink portions. The following parameters may be configured: (1) length of the frame; (2) length/definition of a subframe, if a subframe is defined (a subframe need not be defined); (3) length/definition of a slot, if a slot is defined (a slot need not be defined); (4) CP length, which may vary between symbol blocks and which may be measured in terms of number of CP symbols (e.g. downlink symbol block 1 has one CP symbol, and downlink symbol block 2 has two CP symbols); (5) length of the data portion, which may be controlled by configuring how many data symbols are transmitted in a symbol block (e.g. downlink symbol block 2 transmits more data symbols than downlink symbol block 1 and therefore has a longer data portion than downlink symbol block 1); (6) switching gap length, which need not be related to symbol length or symbol block length (e.g. the switching gap may be shorter than one symbol, as illustrated at 402, and in general the switching gap does not need to be an integer multiple of symbol duration time), plus in general non-equal switching gap lengths can co-exist in the same frame and/or a switching gap length may differ from frame to frame; (7) ratio between duration of CP symbols and the duration of data symbols, which may be adjusted. Non-equal symbol block duration can co-exist in the same frame. Note that in FIG. 10 a switching gap exists both for switching from downlink to uplink and for switching from uplink to downlink. However, in other embodiments, the gap may exist either for switching from downlink to uplink or for switching from uplink to downlink.

In some embodiments, a CP may not be present in one or more symbol blocks, i.e. CP length $t_{CP}$=0. An example is downlink symbol block 3 in FIG. 10, which only includes data symbols. In some embodiments, a switching gap duration may be an integer multiple of symbol duration time, particularly because in a single-carrier symbol block the duration of one symbol is typically much shorter than a traditional OFDM symbol generated by IFFT. An example is shown at 404 in FIG. 10, which illustrates a switching gap duration that is twice as long as a symbol duration $t_s$.

Figure 11:
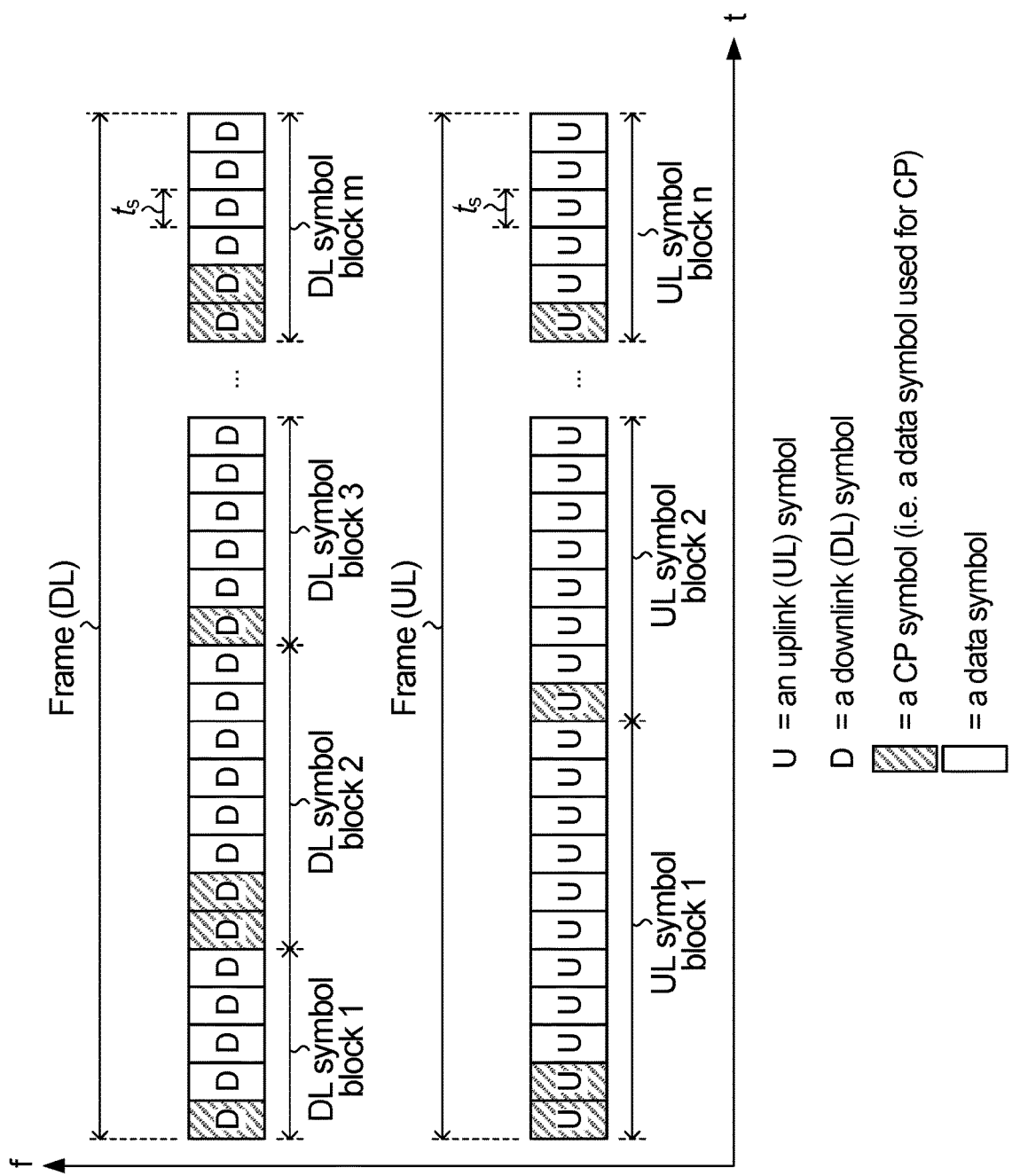

FIG. 10 illustrates a frame that is part of a time division duplex (TDD) configuration. FIG. 11 is a variation of FIG. 10 in which the frame is instead part of a frequency division duplex (FDD) configuration. The same parameters are adjustable, but in FIG. 11 a frame is only downlink or uplink. The downlink frames are transmitted on a different frequency band from the uplink frames. A downlink frame may be the same duration as an uplink frame and sent at the same time as an uplink frame, as illustrated in FIG. 11, although this is not necessary. In general, and as illustrated, the symbol block lengths and CP/data symbol ratio may be different between uplink and downlink frames. For example, in FIG. 11 downlink symbol block 1 has one CP symbol and four data symbols, whereas uplink symbol block 1 has two CP symbols and nine data symbols. In general, the number of symbol blocks in a downlink frame may be different from the number of symbol blocks in an uplink frame, i.e. m does not necessarily equal n in FIG. 11. In some embodiments, the basic symbol duration may be the same for both uplink and downlink, as illustrated (i.e. symbol duration $t_s$ is the same for both downlink and uplink), although this is not necessary.

Although not illustrated, in a variation of FIG. 11 the flexible frame structure may be employed in a full duplex system, e.g. in which the uplink and downlink frames share the same time-frequency resources, but with different frame configurations. In some embodiments, full duplex may be supported in the whole frame or in part of the frame (e.g. within a certain time period in the frame).

In the examples illustrated in FIGS. 10 and 11, the CP duration of one or more symbol blocks could be 0 ms, i.e. no CP for that symbol block, e.g. as shown in downlink symbol block 3 in FIG. 10.

Figure 12:
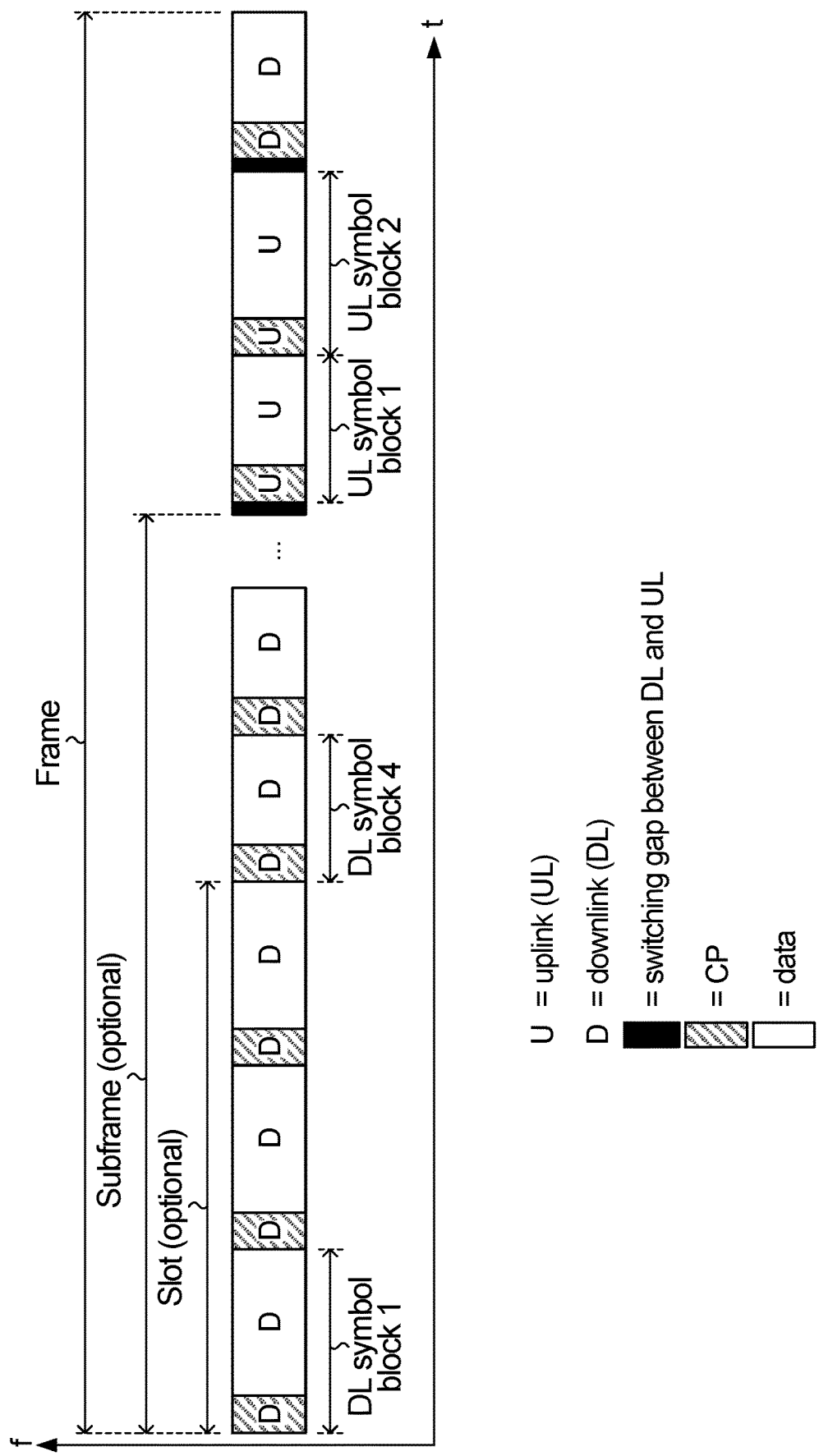

One example of a flexible frame structure based on a multi-carrier waveform is illustrated in FIG. 12. Each symbol block includes a redundancy portion in the form of a CP, and a data portion. The CP may be at the beginning of each symbol block, as illustrated in FIG. 12. Each symbol block transmits a plurality of data symbols in parallel on a plurality of subcarriers. A plurality of symbol blocks are scheduled in the frame. The frame includes downlink and uplink portions. The following parameters may be configured: (1) length of the frame; (2) length/definition of a subframe, if a subframe is defined (a subframe need not be defined); (3) length/definition of a slot, if a slot is defined (a slot need not be defined); (4) CP length, which may vary between symbol blocks (e.g. downlink symbol block 1 has a longer CP length than downlink symbol block 4); (5) length of the data portion, which may be controlled by configuring a particular IDFT size and/or subcarrier spacing (e.g. uplink symbol block 2 has a longer data portion than uplink symbol block 1); (6) switching gap length, which need not be related to symbol block length (e.g. the switching gap may be shorter than one symbol block, as illustrated in FIG. 12, and in general the switching gap does not need to be an integer multiple of symbol block length), plus in general non-equal switching gap lengths can co-exist in the same frame and/or a switching gap length may differ from frame to frame; (7) ratio between duration of CP and the duration of data, which may be adjusted. Non-equal symbol block duration can co-exist in the same frame, with the non-equal symbol blocks possibly having the same sub-carrier spacing or different sub-carrier spacing, depending upon the configuration. Note that in FIG. 12 a switching gap exists both for switching from downlink to uplink and for switching from uplink to downlink. However, in other embodiments, the gap may exist either for switching from downlink to uplink or for switching from uplink to downlink.

Figure 13:
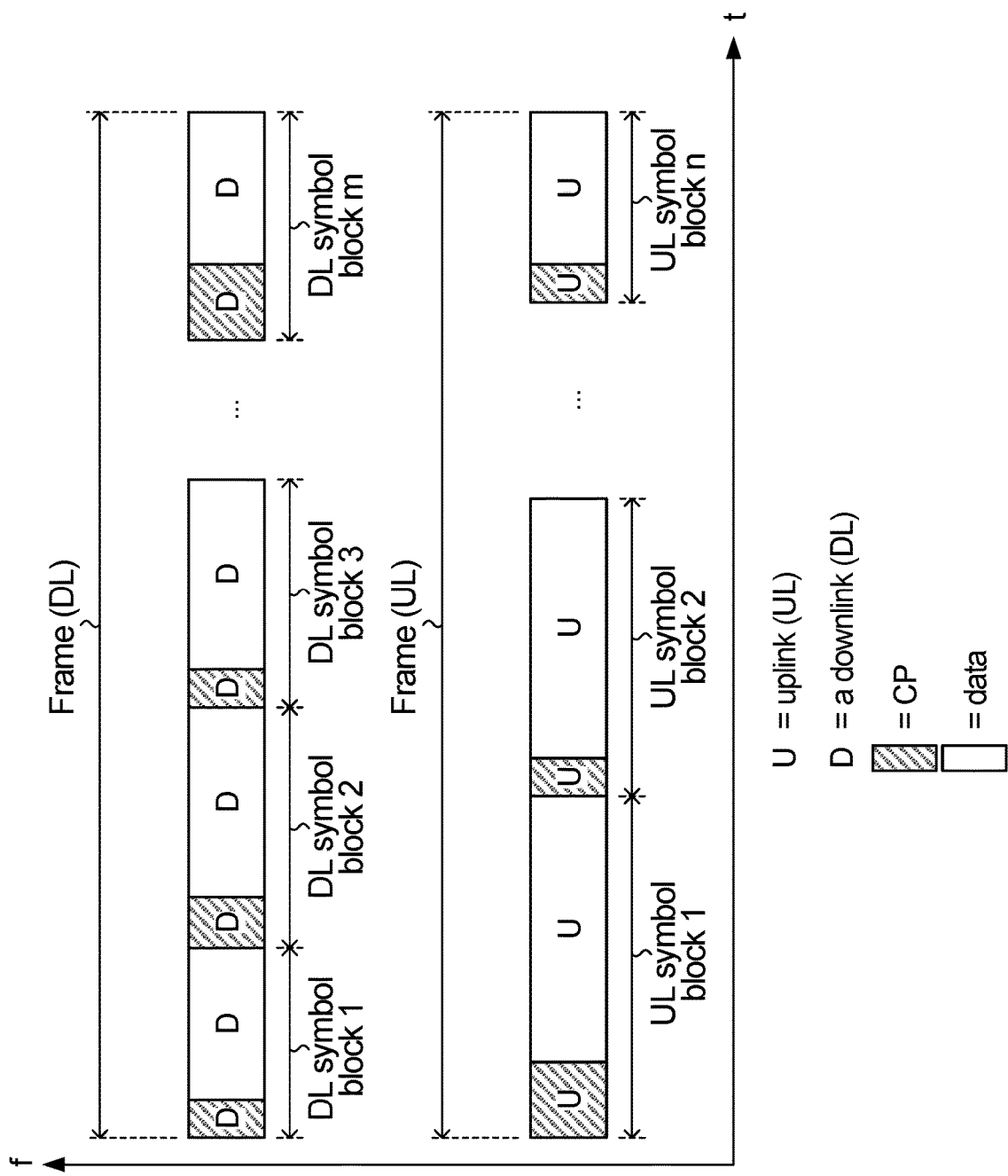

FIG. 12 illustrates a frame that is part of a TDD configuration. FIG. 13 is a variation of FIG. 12 in which the frame is instead part of a FDD configuration. The same parameters are adjustable, but in FIG. 13 a frame is only downlink or uplink. The downlink frames are transmitted on a different frequency band (i.e. on different carriers) from the uplink frames. A downlink frame may be the same duration as an uplink frame and sent at the same time as an uplink frame, as illustrated in FIG. 13, although this is not necessary. In general, and as illustrated in FIG. 13, the symbol block lengths and CP/data length ratio may be different between uplink and downlink frames. In general, the number of symbol blocks in a downlink frame may be different from the number of symbol blocks in an uplink frame, i.e. m does not necessarily equal n in FIG. 13.

Although not illustrated, in a variation of FIG. 13 the flexible frame structure may be employed in a full duplex system, e.g. in which the uplink and downlink frames share the same time-frequency resources.

Figure 14:
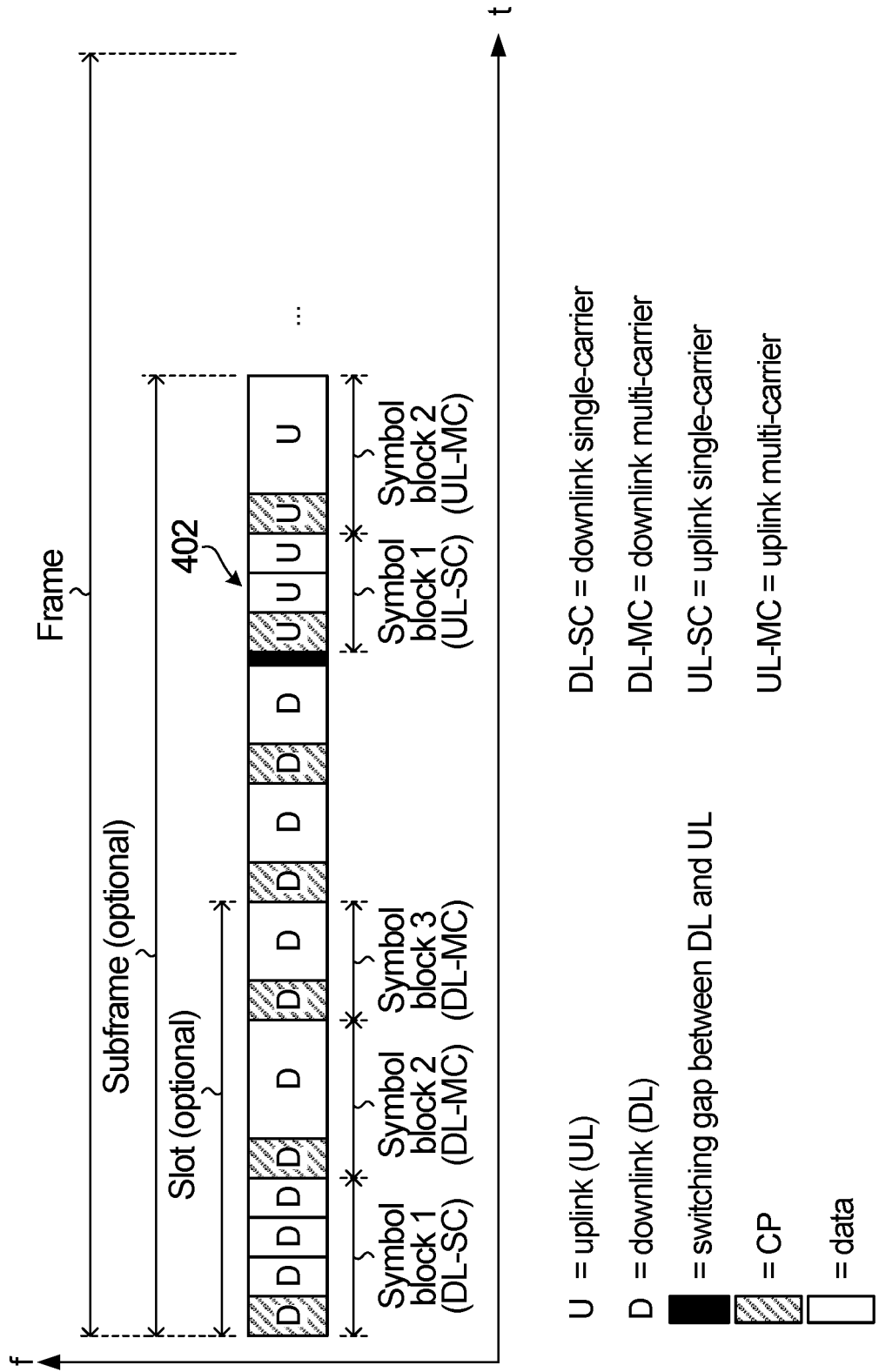

One example of a flexible frame structure including both single-carrier and multi-carrier waveforms is illustrated in FIG. 14. A multi-carrier symbol block and a single-carrier symbol block may co-exist in the same frame, as illustrated in FIG. 14. At a particular time resource in the frame, either a single-carrier symbol block or a multi-carrier symbol block may be scheduled, e.g. to meet different requirements. Different time-domain granularities may also be supported, as illustrated in FIG. 14. The frame includes downlink and uplink portions. The following parameters may be configured: (1) length of the frame; (2) length/definition of a subframe, if a subframe is defined (a subframe need not be defined); (3) length/definition of a slot, if a slot is defined (a slot need not be defined); (4) CP length, which may vary between symbol blocks; (5) length of the data portion, which may vary between symbol blocks; (6) switching gap length, which need not be related to symbol block length (e.g. the switching gap may be shorter than one symbol block, as illustrated, and in general the switching gap does not need to be an integer multiple of symbol block length), plus in general non-equal switching gap lengths can co-exist in the same frame and/or a switching gap length may differ from frame to frame; (7) ratio between duration of CP and the duration of data; (8) duration(s) within the frame during which a single-carrier waveform is transmitted and/or duration(s) within the frame during which a multi-carrier waveform is transmitted, and such duration(s) may be signalled by the base station dynamically, e.g. using a UE-specific channel, such as via a scheduling signal. Non-equal symbol block duration can co-exist in the same frame. Note that although it is not shown in FIG. 14, the occupied bandwidth by a single-carrier symbol block and by a multi-carrier symbol block can be different. In some embodiments, the bandwidth occupied by a single-carrier symbol block is smaller or much smaller than the bandwidth occupied by a multi-carrier symbol block.

Figure 15:
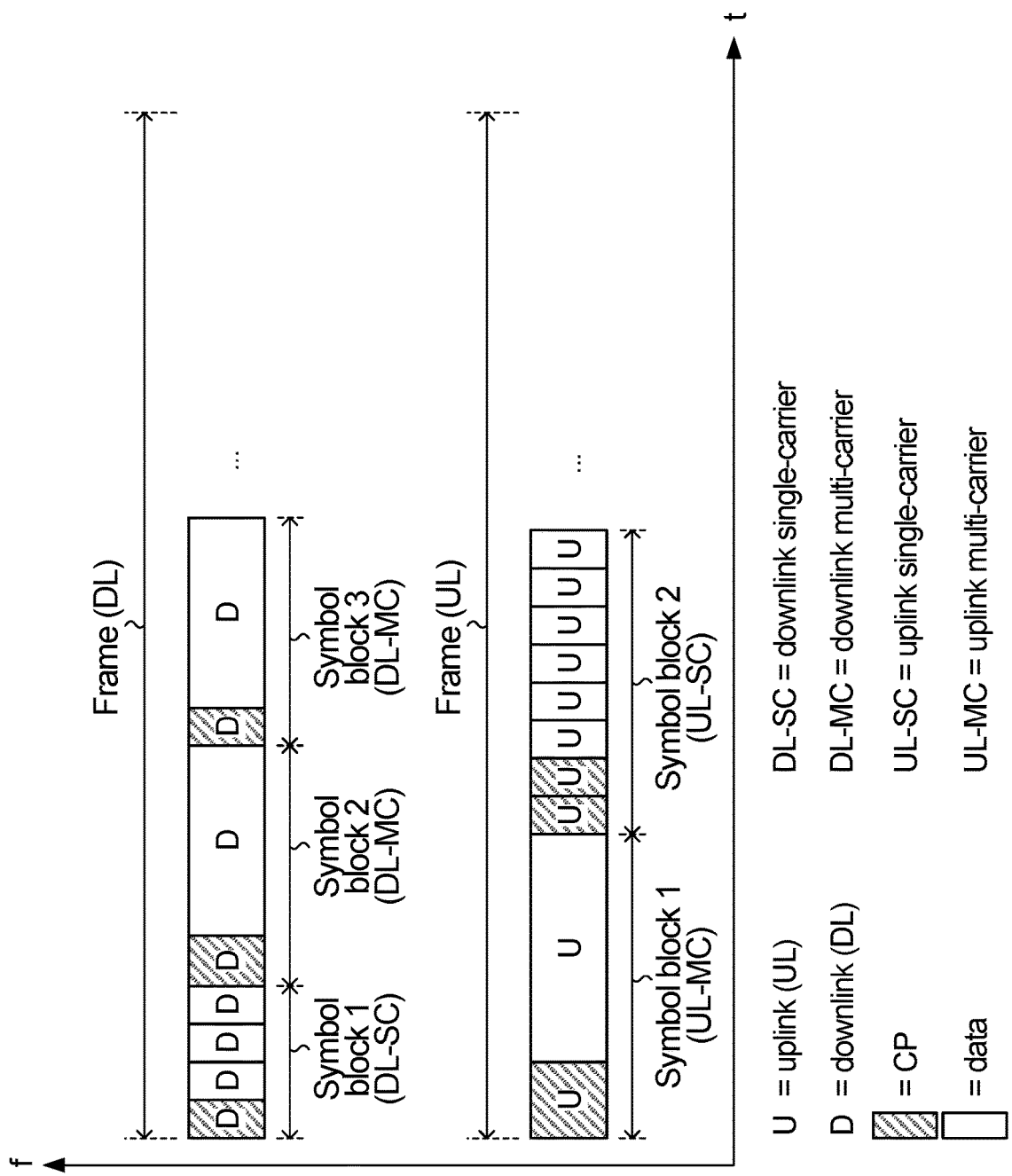

FIG. 14 illustrates a frame that is part of a TDD configuration. FIG. 15 is a variation of FIG. 14 in which the frame is instead part of a FDD configuration. The same parameters are adjustable, but in FIG. 15 a frame is only downlink or uplink. The downlink frames are transmitted on a different frequency band from the uplink frames. A downlink frame may be the same duration as an uplink frame and sent at the same time as an uplink frame, as illustrated in FIG. 15, although this is not necessary. In general, and as illustrated in FIG. 15, the symbol block lengths and CP/data length ratio may be different between uplink and downlink frames. Also, in general, the number of symbol blocks in a downlink frame may be different from the number of symbol blocks in an uplink frame.

Although not illustrated, in a variation of FIG. 15 the flexible frame structure may be employed in a full duplex system, e.g. in which the uplink and downlink frames share the same time-frequency resources.

Figure 16:
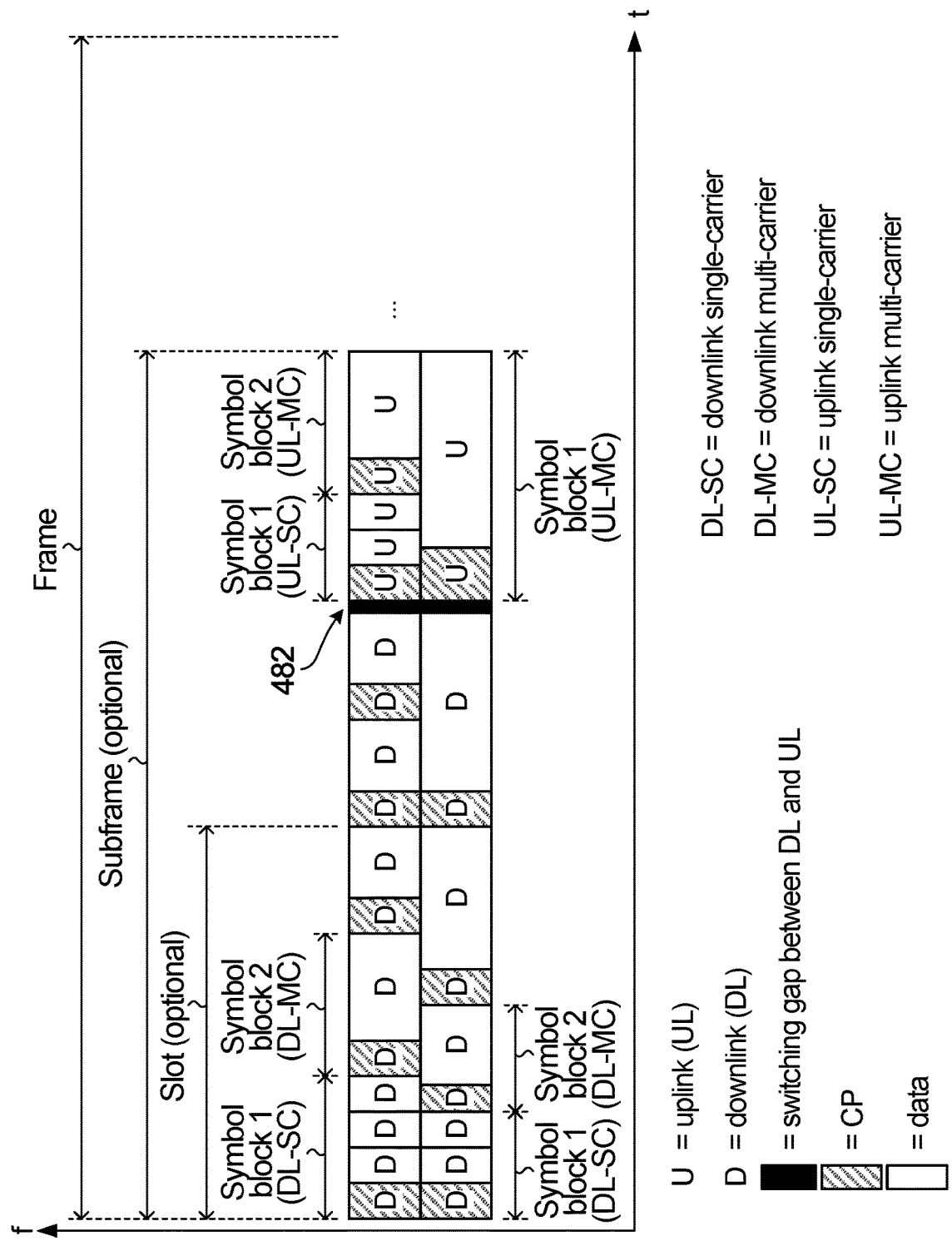

FIG. 16 illustrates a variation of FIG. 15 in which a frame may be defined over different frequency partitions (e.g. different bandwidth parts), and the different frequency partitions can have different symbol configurations over the same time duration. The example in FIG. 16 illustrates two frequency partitions, although more frequency partitions may be included. Over a particular time duration, one frequency partition may transmit a single-carrier based signal, and the other frequency partition may transmit a multi-carrier based signal, and symbol blocks do not need to be time aligned between the different frequency partitions. For example, in FIG. 16 the start time and end time of a symbol block in one frequency partition does not always line up with the start time and end time of a symbol block in the other frequency partition. However, the switching gap between downlink and uplink is time aligned across the frequency partitions, as shown at 482, which is relatively easy to achieve due to the flexibility in symbol block durations in each frequency partition. The length of the switching gap may be configurable and may change within a frame, or from frame-to-frame. To control the inter-band interference caused by the different symbol configurations, subband windowing, subband filtering, and/or a guard-band may be applied. A guard-band is a small portion of frequency-domain resource which separates two adjacent subbands and is not used for signal transmission so as to mitigate the inter-band interference between the two subbands.

The example in FIG. 16 illustrates a mixed single-carrier and multi-carrier use case. However, the example in FIG. 16 may alternatively be adapted to single-carrier or multi-carrier use cases (e.g. all single-carrier symbol blocks in FIG. 16 or all multi-carrier signal blocks in FIG. 16). In some embodiments, one frequency partition may be used to only transmit single-carrier based signals, and the other frequency partition may be used to only transmit multi-carrier based signals. Also, although not illustrated, in a variation of FIG. 16 the flexible frame structure may be employed in a FDD system by having the downlink and uplink occupy different carriers, similar to FIGS. 11, 13, and 15, or in a full duplex system, e.g. in which the uplink and downlink frames share the same time-frequency resources.

The data symbols transmitted in any of the flexible frame structures disclosed herein, e.g. in the frame structures illustrated in FIGS. 10-16, may be generated using any modulation scheme implemented by the symbol mappers, i.e. symbol mapper 350 of FIG. 8 in the case of a single-carrier waveform, or symbol mappers 350A-N of FIG. 9 in the case of a multi-carrier waveform. Example modulation schemes include BPSK, PSK, QAM, and OQAM.

Signaling the Parameters of a Flexible Frame Structure

As discussed above, a flexible frame structure may have several configurable parameters, e.g. configurable frame length, configurable subframe duration, configurable slot duration, configurable symbol block length, etc. The configurable parameters need to be determined by the UE. In some embodiments, one or more of the configurable parameters may be preconfigured or dynamically determined by the UE. Examples are provided below.

1. Frame Length

In some embodiments, the frame length is known and preconfigured in advance, e.g. predefined by a standard.

In some embodiments, if there is more than one possible frame length value, the selection of the frame length may be associated with a particular application scenario or deployment scenario. For example, a UE may be preconfigured to know the frame length based on the application, e.g.: an autonomous vehicle application may be preconfigured to have a frame length of 5 ms, and a smart meter application may be preconfigured to have a frame length of 10 ms or longer (such as 20 ms).

In some embodiments, each frame may include at least one downlink synchronization channel, and a UE may use blind detection to blindly detect a synchronization signal in the synchronization channel and from there obtain the frame length. One example is as follows: A frame may include one or more downlink synchronization channels and one or more downlink broadcast channels. Each synchronization channel and/or broadcast channel may possibly be transmitted in a different direction by different beamforming. There may therefore be more than one possibility to access or re-access the system in a frame. When a UE initially accesses or re-accesses the system, the UE blindly searches for a synchronization channel. After successfully synchronizing to the system, the UE may then obtain basic information required for further communications by decoding the broadcast channel. More information/signaling may then be obtained from a second level broadcast channel. For example, the channel resources and transmission parameters/settings may be indicated in the basic information carried by the broadcast channel, and this basic information may then be used to obtain second level broadcast channel information (e.g. the basic information may indicate the time-frequency resources at which the second level broadcast information is located). The second level broadcast channel information may then be used to obtain additional information/signaling. The frame length may be present in the basic information or in the second level broadcast channel information.

In some embodiments, the frame length is obtained from the period of the synchronization channel and/or the period of the broadcast channel, e.g. if the transmission period of the synchronization channel and/or the broadcast channel are predefined. For example, if there is a mapping relationship between the length of the frame and the periodicity of synchronization channel, then by knowing or determining the periodicity of the synchronization channel the frame length may also be determined.

2. Subframe Configuration

In general, a subframe may or may not be defined (i.e. a subframe may be 'enabled' or 'disabled'), and this may be indicated using control signaling.

In some embodiments, the frame may include a downlink broadcast channel, and the subframe length may be determined by the UE using information in the broadcast channel. For example, a UE may decode the broadcast channel, and the information indicating the subframe length may be present as part of the information in the broadcast channel. For example, the broadcast channel may include a two-bit field that is used to indicate which subframe length is defined for the frame, e.g. '00'=no subframe length defined, '01'=2 ms subframe length, '10'=5 ms subframe length, '11'=10 ms subframe length. In some embodiments, the basic broadcast information decoded in the broadcast channel indicates the location of another time-frequency resource in the frame that the UE is to decode to obtain the subframe length. For example, the subframe length may be present in second level broadcast channel information located at this other time-frequency resource.

Using the broadcast channel to indicate the subframe length may work well if the subframe length is not UE-specific (i.e. the subframe length is the same for multiple UEs) and/or if the subframe length configuration is to be configured on a frame basis, e.g. if the subframe length configuration for a frame changes on a slow basis, such as on a frame-by-frame basis.

In other embodiments, the subframe length may be indicated using multicast or unicast signaling. In some embodiments, the subframe length may be indicated in a common control channel, which may be transmitted periodically with a configured period, or in an aperiodic way where UE blind detection is needed. In some embodiments, the subframe length may be indicated to a UE using dynamic signaling, such as downlink control information (DCI), or instead using higher-layer signaling, such as radio resource control (RRC) signaling. If DCI is used to indicate the subframe length, then the DCI may be UE-specific DCI or group-common DCI.

In some embodiments, UE-specific RRC signaling is used to indicate the possible options of subframe configuration (including no subframe configuration), and DCI can be used to indicate, for a frame, which particular subframe configuration is to be used. The DCI may be located at the beginning of the frame, or at another location that may be signaled by RRC signaling or that may be signaled by information in the broadcast channel (e.g. in the second level broadcast channel).

In one specific example, a group-common DCI or UE-specific DCI is used to indicate the subframe configuration for a frame. The DCI may be located at the beginning of the frame. Alternatively, the DCI may be located in a previous frame, where that location is either signaled to the UE or predefined, e.g. specified in a standard. If the location is signaled, then the signaled location parameters may include an offset in number of frames and/or the location within the previous frame.

In another specific example, broadcasted system information is used to indicate the possible options of subframe configuration, and a group common or UE-specific DCI is used to indicate which particular subframe configuration is to be used. The DCI may be located at the beginning of the frame. Alternatively, the DCI may be located in a previous frame, where that location is either signaled to the UE or predefined, e.g. specified in a standard. If the location is signaled, then the signaled location parameters may include an offset in number of frames and/or the location within the previous frame.

In some embodiments, RRC signaling is used to signal a frame-based subframe configuration, and DCI is used to dynamically update/change the configuration within the frame, e.g. DCI is used to dynamically change the subframe length within the frame.

In some embodiment, RRC signaling is used to indicate the possible options of subframe configuration, and DCI can be used to indicate the selection of subframe configuration for the frame and to update of subframe length within the frame.

In some embodiments, the subframe length may be implicit, e.g. dependent upon the application scenario, and/or indicated by the location or period of one or more synchronization signal blocks (SSBs), or indicated by the location or period of a common broadcast channel.

In some embodiments, the enabling and disabling of a subframe is associated with certain application/service or deployment scenarios. In this case, no explicit signaling is needed for indicating the on-and-off of a subframe setting. For example, it may be preconfigured that if the application is autonomous vehicles then there is a subframe defined, and if the application is smart meters then there is no subframe defined. The length of the subframe may also be preconfigured based on the application/service or deployment scenario, e.g. the subframe is 1 ms if the application is smart meters.

3. Slot Configuration

In general, a slot may or may not be defined (i.e. a slot may be 'enabled' or 'disabled'), and this may be indicated using control signaling.

A slot length may be defined in terms of time duration (e.g. a slot length is 1 ms) or number of symbol blocks (e.g. a slot length is 7 OFDM symbols).

In some embodiments, the slot configuration (e.g. slot length) may be implicit, e.g. dependent upon the application scenario, and/or indicated by the location or period of one or more synchronization signal blocks (SSBs), or indicated by the location or period of a common broadcast channel.

In some embodiments, the slot configuration may be explicitly signalled, e.g. carried by broadcast signaling, RRC signaling, group common DCI or UE specific DCI.

In some embodiments, UE-specific RRC signaling is used to indicate the possible options of slot configuration (including no slot configuration), and DCI (e.g. UE-specific DCI) can be used to indicate, for a frame, which particular slot configuration is to be used. The DCI may be located at the beginning of the frame, or at another location that may be signaled by RRC signaling or that may be signaled by information in the broadcast channel (e.g. in the second level broadcast channel).

In one specific example, a group-common DCI or UE-specific DCI is used to indicate the slot configuration for a frame. The DCI may be located at the beginning of the frame. Alternatively, the DCI may be located in a previous frame, where that location is either signaled to the UE or predefined, e.g. specified in a standard. If the location is signaled, then the signaled location parameters may include an offset in number of frames and/or the location within the previous frame.

In another specific example, broadcasted system information is used to indicate the possible options of slot configuration, and a group common or UE-specific DCI is used to indicate which particular slot configuration is to be used. The DCI may be located at the beginning of the frame. Alternatively, the DCI may be located in a previous frame, where that location is either signaled to the UE or predefined, e.g. specified in a standard. If the location is signaled, then the signaled location parameters may include an offset in number of frames and/or the location within the previous frame.

In some embodiments, RRC signaling is used to signal a frame-based slot configuration, and DCI is used to dynamically update/change the configuration within the frame, e.g. DCI is used to dynamically change the slot length within the frame.

In some embodiment, RRC signaling is used to indicate the possible options of slot configuration, and DCI can be used to indicate the selection of slot configuration for the frame and to update of slot length within the frame.

In some embodiments, the enabling and disabling of a slot is associated with certain application/service or deployment scenarios. In this case, no explicit signaling is needed for indicating the on-and-off of a slot setting. For example, it may be preconfigured that if the application is autonomous vehicles then there is a slot defined, and if the application is smart meters then there is no slot defined. The length of the slot (in time and/or in number of symbols) may also be preconfigured based on the application/service or deployment scenario, e.g. the slot has 14 OFDM symbols (or more) if the application is smart meters.

4. Symbol Block Configuration

In some embodiments, the configuration of a symbol block (e.g. symbol block length, CP versus data portion, etc.) may be defined on a frame basis or on a UE basis. Signaling options include: per UE based RRC signaling or DCI, or common control signaling.

In some embodiments, UE-specific RRC signaling is used to indicate the possible options of symbol block configuration, and DCI can be used to indicate, for a frame, which particular symbol block configuration is to be used. The DCI may be located at the beginning of the frame, or at another location that may be signaled by RRC signaling or that may be signaled by information in the broadcast channel (e.g. in the second level broadcast channel).

In one specific example, a group-common DCI or UE-specific DCI is used to indicate the symbol block configuration for a frame. The DCI may be located at the beginning of the frame. Alternatively, the DCI may be located in a previous frame, where that location is either signaled to the UE or predefined, e.g. specified in a standard. If the location is signaled, then the signaled location parameters may include an offset in number of frames and/or the location within the previous frame.

In another specific example, broadcasted system information is used to indicate the possible options of symbol block configuration, and a group common or UE-specific DCI is used to indicate which particular symbol block configuration is to be used. The DCI may be located at the beginning of the frame. Alternatively, the DCI may be located in a previous frame, where that location is either signaled to the UE or predefined, e.g. specified in a standard. If the location is signaled, then the signaled location parameters may include an offset in number of frames and/or the location within the previous frame.

In some embodiments, RRC signaling is used to signal a frame-based symbol block configuration, and DCI is used to dynamically update/change the configuration within the frame, e.g. DCI is used to dynamically change the symbol block length (and/or CP length) within the frame.

In some embodiment, RRC signaling is used to indicate the possible options of symbol block configuration, and DCI can be used to indicate the selection of symbol block configuration for the frame and to update of symbol block length (and/or CP length) within the frame.

In some embodiments, the symbol block configuration may be associated with certain application/service or deployment scenarios. In this case, no explicit signaling is needed for indicating the symbol block configuration. For example, it may be preconfigured that if the application is autonomous vehicles then all symbol blocks are OFDM symbols with a CP of a particular duration. As another example, it may be preconfigured that all symbol blocks are OFDM symbols with a CP of a particular duration for a particular latency requirement for ultra-reliable low latency communication (URLLC).

In general, there is a trade-off between signaling overhead and flexibility: the more flexibility in the frame structure, the higher the overhead signaling required to inform the UEs of the parameters of the frame structure. However, the benefit of having a flexible frame structure, e.g. to accommodate different application scenarios and/or to improve data transmission, offsets the potential additional signaling overhead.

General Methods

Figure 17:
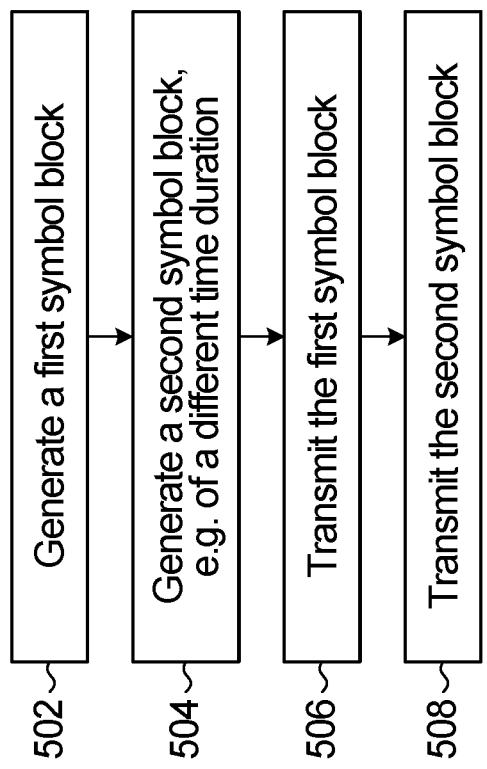
FIG. 17 is a method performed by an apparatus, according to one embodiment.

FIG. 17 is a method performed by an apparatus, according to one embodiment.

The apparatus may be a base station (e.g. base station 170) or a UE (e.g. UE 110). The method relates to wireless communication, and in particular transmitting in a wireless communication system. In step 502, a first symbol block is generated, e.g. the first symbol block may be generated as a single-carrier symbol block or a multi-carrier symbol block, as described above in relation to FIGS. 8 and 9. The first symbol block has a first CP and a first data portion. In step 504, a second symbol block is generated, e.g. the second symbol block may be generated as a single-carrier symbol block or a multi-carrier symbol block, as described above in relation to FIGS. 8 and 9. The second symbol block has a second CP and a second data portion. In step 506, the first symbol block is transmitted, and in step 508 the second symbol block is transmitted. The generation steps 502 and 504 may be optional, e.g. if the symbol blocks are already generated prior to the method of FIG. 17.

In some embodiments, the first symbol block has a first time duration, and the second symbol block has a second time duration that is different from the first time duration. In some embodiments, the first symbol block and the second symbol block are transmitted in a same frame. In some embodiments, the first symbol block and the second symbol block are transmitted in different subframes and/or in different slots. In some embodiments, the first CP has a different length than the second CP. In some embodiments, the first data portion has a different time duration than the second data portion.

In some embodiments, the first symbol block is a single-carrier symbol block and the first data portion comprises a first set of data symbols transmitted on a same single-carrier frequency. In some embodiments, the second symbol block is a multi-carrier symbol block and the second data portion comprises a second set of data symbols, and each data symbol of the second set of data symbols is transmitted on a respective different subcarrier frequency. In some embodiments, the second symbol block is an OFDM symbol.

In some embodiments, the frame includes an uplink portion and a downlink portion, and the first symbol block and the second symbol block are both transmitted in either the uplink portion or the downlink portion. In some embodiments, a configurable switching gap exists between the uplink portion and the downlink portion. The configurable switching gap may have a duration in time that is not a function of symbol length or symbol block length. In some embodiments, the first symbol block and the second symbol block are transmitted over a first bandwidth, and the method may further include transmitting and receiving other symbol blocks over a second bandwidth. The configurable switching gap may be at a same time location and aligned in time in both the first bandwidth and the second bandwidth (e.g. like in FIG. 16).

In some embodiments, the first symbol block is transmitted in a first subframe, and the second symbol block is transmitted in a second subframe. In some embodiments, the first symbol block is transmitted in a first slot, and the second symbol block is transmitted in a second slot. In some embodiments, the first symbol block is transmitted to or by a first UE and the second symbol block is transmitted to or by a second UE. In some embodiments, the first symbol block and the second symbol block are transmitted to or by a same UE.

In some embodiments, the method further includes obtaining control information indicating at least one of: a time duration of the first CP; a time duration of the second CP; a time duration of the first data duration; a time duration of the second data duration; a subframe length; a subframe location; a slot length; a slot location; a switching gap length; a switching gap location. In some embodiments, the obtaining the control information includes: receiving encoded control information, and decoding the encoded control information to obtain the control information. The encoded control information may be received in the downlink (e.g. in a downlink portion of a frame) or in the uplink (e.g. in an uplink portion of a frame) or in a sidelink (e.g. in the case of device-to-device communications).

In some embodiments, the first symbol block and the second symbol block are transmitted by a base station. In some embodiments, the method further includes transmitting control information indicating at least one of: a time duration of the first CP; a time duration of the second CP; a time duration of the first data duration; a time duration of the second data duration; a subframe length; a subframe location; a slot length; a slot location; a switching gap length; a switching gap location.

In some embodiments, the first symbol block and the second symbol block are transmitted in different frames.

The method embodiments described above in relation to FIG. 17 are only examples. Other methods are possible. Some other example methods are presented below.

In some embodiments, a method of transmitting in a wireless communication system is provided. The method may include: generating a first set of data symbols on a same single carrier frequency, generating a first CP using at least one data symbol of the first set of data symbols, and appending the first set of data symbols to the first CP to generate a single-carrier symbol block (e.g. like in FIG. 8). The method may further include generating a second set of data symbols, each data symbol of the second set of data symbols on a respective different subcarrier frequency, operating on the second set of data symbols using an inverse discrete fourier transform to obtain a data portion, and appending the data portion to a second CP to generate a multi-carrier symbol block (e.g. like in FIG. 9). The method may further include transmitting the single-carrier symbol block and the multi-carrier symbol block. In some embodiments, the single-carrier symbol block and the multi-carrier symbol block are transmitted in a same frame. In some embodiments, the single-carrier symbol block and the multi-carrier symbol block are transmitted in different subframes and/or in different slots. In some embodiments, the single-carrier symbol block has a first time duration, and the multi-carrier symbol block has a second time duration that is different from the first time duration. In some embodiments, the first CP has a different length than the second CP. In some embodiments, the multi-carrier symbol block is an OFDM symbol. In some embodiments, the frame includes an uplink portion and a downlink portion, and the single-carrier symbol block and the multi-carrier symbol block are both transmitted in either the uplink portion or the downlink portion. In some embodiments, a configurable switching gap exists between the uplink portion and the downlink portion. In some embodiments, the configurable switching gap has a duration in time that is not a function of symbol length or symbol block length. In some embodiments, the single-carrier symbol block and the multi-carrier symbol block are transmitted over a first bandwidth, and the method further includes transmitting and receiving other symbol blocks over a second bandwidth, and the configurable switching gap is at a same time location and aligned in time in both the first bandwidth and the second bandwidth. In some embodiments, the single-carrier symbol block is transmitted by a first UE and the multi-carrier symbol block is transmitted by a second UE. In some embodiments, the single-carrier symbol block and the multi-carrier symbol block are transmitted to or by a same UE. In some embodiments, control information is obtained and/or transmitted indicating at least one of: a time duration of the first CP; a time duration of the second CP; a number of data symbols in the first set of data symbols; a time duration of the first set of data symbols; a time duration of the data duration; a subframe length; a subframe location; a slot length; a slot location; a switching gap length; a switching gap location. In some embodiments, the single-carrier symbol block and the multi-carrier symbol block are transmitted by a base station.

In some embodiments, a method of transmitting in a wireless communication system is provided. The method includes transmitting a first symbol block in a first subframe having a first subframe duration. The method may further include transmitting a second symbol block in second subframe having a second subframe duration. In some embodiments, the first subframe duration is different from the second subframe duration. In some embodiments, the first subframe and the second subframe are in different frames. In some embodiments, the first subframe and the second subframe are in the same frame. In some embodiments, the method further includes obtaining and/or transmitting control information indicating at least one of: the first subframe duration; the first subframe location; the second subframe duration; the second subframe location. In some embodiments, the method is performed by a UE, and obtaining the control information includes: receiving encoded control information in a downlink portion of one or more frames, and decoding the encoded control information to obtain the control information. In some embodiments, the first symbol block has a first CP and a first data portion, the second symbol block has a second CP and a second data portion, the first symbol block has a first time duration, the second symbol block has a second time duration, and optionally the first time duration is different from the second time duration. In some embodiments, the first symbol block is a single-carrier symbol block and the second symbol block is a multi-carrier symbol block, or vice versa.

In some embodiments, a method of transmitting in a wireless communication system is provided. The method includes transmitting a first data symbol in a first slot having a first slot duration. The method may further include transmitting a second data symbol in second slot having a second slot duration. In some embodiments, the first slot duration is different from the second slot duration. In some embodiments, the first slot and second slot may be in a same frame or in a different frame, and optionally control information may be obtained and/or transmitted indicating at least one of: the first slot duration; the first slot length; the second slot duration; the second slot length.

In some embodiments, a method for wireless communication is provided. The method includes transmitting a first symbol block having a first CP and a first data portion. The method may further include receiving a second symbol block having a second CP and a second data portion. In some embodiments, the first symbol block has a first time duration, and the second symbol block has a second time duration that is different from the first time duration. In some embodiments, the first symbol block is transmitted and the second symbol block is received in a same single frame, although they may be in separate frames. In some embodiments, the transmitting and receiving may occur on different bandwidths, e.g. in an FDD system. In some embodiments, the first symbol block may be a single-carrier or multi-carrier symbol block, and the second symbol block may be a single-carrier or multi-carrier symbol block.

In some embodiments, a method for wireless communication is provided. The method includes transmitting a first symbol block in a first subframe having a first subframe duration. The method may further include receiving a second symbol block in second subframe having a second subframe duration. In some embodiments, the first subframe duration may be different from the second subframe duration. In some embodiments, the first subframe and the second subframe may be in a single same frame, although they may instead be in separate frames. In some embodiments, control information is obtained and/or transmitted that indicates at least one of: the first subframe duration; the first subframe location; the second subframe duration; the second subframe location.

In some embodiments, a method for wireless communication is provided. The method includes transmitting a first symbol block in a first slot having a first slot duration. The method may further include receiving a second symbol block in second slot having a second slot duration. The first slot duration may be different from the second slot duration. In some embodiments, the first slot and the second slot are in a single same frame, and optionally also within a single same subframe. In some embodiments, control information is obtained and/or transmitted that indicates at least one of: the first slot duration; the first slot location; the second slot duration; the second slot location.

In some embodiments, a method for wireless communication is provided. The method includes generating a first set of data symbols. Each data symbol of the first set of data symbols is on a respective different subcarrier frequency. The method further includes operating on the first set of data symbols using a first IDFT to obtain a first data portion, and appending the first data portion to a first CP to obtain a first multi-carrier symbol block. The first multi-carrier symbol block will be referred to as a first OFDM symbol. The method further includes transmitting the first OFDM symbol. The method further includes generating a second set of data symbols. Each data symbol of the second set of data symbols is on a respective different subcarrier frequency. The method further includes operating on the second set of data symbols using a second IDFT to obtain a second data portion, and appending the second data portion to a second CP to obtain a second multi-carrier symbol block. The second multi-carrier symbol block will be referred to as a second OFDM symbol. The method further includes transmitting the second OFDM symbol. In some embodiments, the first IDFT has a first size, and the second IDFT has a second size different from the first size. In some embodiments, the first size and/or the second size is not a power of two. In some embodiments, the first IDFT and/or the second IDFT is not an IFFT (i.e. not implemented using IFFT). However, in some embodiments brute-force DFT/IDFT may be undesirably complex, such that there may be at least some limitation in the size of DFT/IDFT. For example, the possible IDFT sizes N may be limited to a set of values that satisfy a predefined relationship or formula that allows for a lower complexity implementation at the transmitter and/or receiver. For example, a lower complexity implementation may be possible if the IDFT size N satisfies a predefined formula based on multiplied powers of prime numbers, e.g. $N=2^\sigma 3^\beta$ or $N=2^\sigma 3^\beta 5^\mu$, where $\sigma$, $\beta$, and $\mu$ are each an integer greater than or equal to zero. In some embodiments, the first OFDM symbol has a first time duration, and the second OFDM symbol has a second time duration that is different from the first time duration. In some embodiments, the first time duration is not a multiple of two of the second time duration, and/or the second time duration is not a multiple of two of the first time duration. In some embodiments, the first OFDM symbol has a first subcarrier spacing, and the second OFDM symbol has a second subcarrier spacing that is different from the first subcarrier spacing. In some embodiments, the first subcarrier spacing is not a multiple of two of the second subcarrier spacing, and/or the second subcarrier spacing is not a multiple of two of the first subcarrier spacing. In some embodiments, the first OFDM symbol and the second OFDM symbol are transmitted in a same frame. In some embodiments, the first OFDM symbol is transmitted in one subframe and/or one slot in the frame, and the second OFDM symbol is transmitted in another subframe and/or another slot in the frame.

In some embodiments, a method performed by a UE is provided. The method includes decoding control information in a frame. The control information may indicate at least one of: frame length of the frame; subframe length; slot length (in terms of time and/or number of symbols or symbol blocks in the slot); symbol block length; CP length; whether a symbol block is single-carrier waveform or a multi-carrier waveform; switching gap length; switching gap location. In some embodiments, the method further includes transmitting or receiving symbol blocks in the frame according to the control information. In some embodiments, the control information is in a broadcast channel. In some embodiments, decoding the control information includes: (1) decoding a broadcast channel in the frame to obtain first information; (2) using the first information to determine a time-frequency resource in the frame at which second information is located; (3) decoding the second information at the time-frequency resource to obtain the control information. In some embodiments, the control information is in a common control channel. In some embodiments, the control information is DCI or RRC signaling or some combination of DCI and RRC signaling. For example, the RRC signaling may indicate possible options for subframe length and/or slot length, and the DCI may indicate which particular subframe length and/or which particular slot length is configured for the frame.

Apparatuses are also disclosed that are configured to perform the methods above.

Note that the term "symbol block" has been used herein to help better distinguish from a data symbol. However, the term "block" is used merely to help with the explanation and is not necessary or meant to be limiting. For example, "single-carrier symbol block" may be replaced with "single-carrier symbol". Similarly, "multi-carrier symbol block" may be replaced with "multi-carrier symbol". Also, the terms "single-carrier" and "multi-carrier" are used herein to distinguish between a symbol transmitted on a single-carrier waveform and a symbol transmitted on a multi-carrier waveform. However, these terms are used merely to help with the explanation and are not meant to be limiting. For example, "single-carrier symbol" (referred to as "single-carrier symbol block" in the explanation above) may instead be replaced with "first type of symbol" or "symbol of a first type", and "multi-carrier symbol" (referred to as "multi-carrier symbol block in the explanation above) may instead be replaced with "second type of symbol" or "symbol of a second type". The labels "first type" and "second type" are used to distinguish between the two types of symbols.

EXAMPLES

In view of, and in addition to the above, the following examples are disclosed.

Example 1: A method of transmitting in a wireless communication system, the method comprising: transmitting a first symbol block having a first cyclic prefix (CP) and a first data portion; transmitting a second symbol block having a second CP and a second data portion; wherein the first symbol block has a first time duration, and wherein the second symbol block has a second time duration that is different from the first time duration.

Example 2: The method of example 1, wherein the first symbol block and the second symbol block are transmitted in a same frame.

Example 3: The method of example 2, wherein the first symbol block and the second symbol block are transmitted in different subframes and/or in different slots.

Example 4: The method of any one of examples 1 to 3, wherein the first CP has a different length than the second CP.

Example 5: The method of any one of examples 1 to 4, wherein the first data portion has a different time duration than the second data portion.

Example 6: The method of any one of examples 1 to 5, wherein the first symbol block is a single-carrier symbol block and the first data portion comprises a first set of data symbols transmitted on a same single carrier frequency, and wherein the second symbol block is a multi-carrier symbol block and the second data portion comprises a second set of data symbols, and each data symbol of the second set of data symbols is transmitted on a respective different carrier frequency.

Example 7: The method of example 6, wherein the second symbol block is an orthogonal frequency-division multiplexing (OFDM) symbol.

Example 8: The method of any one of examples 1 to 7, wherein the frame includes an uplink portion and a downlink portion, and wherein the first symbol block and the second symbol block are both transmitted in either the uplink portion or the downlink portion.

Example 9: The method of example 8, wherein a configurable switching gap exists between the uplink portion and the downlink portion.

Example 10: The method of example 9, wherein the configurable switching gap has a duration in time that is not a function of symbol length or symbol block length.

Example 11: The method of example 9 or example 10, wherein the first symbol block and the second symbol block are transmitted over a first bandwidth, wherein the method further comprises transmitting and receiving other symbol blocks over a second bandwidth, and wherein the configurable switching gap is at a same time location and aligned in time in both the first bandwidth and the second bandwidth.

Example 12: The method of any one of examples 1 to 11, wherein the first symbol block is transmitted in a first subframe, and the second symbol block is transmitted in a second subframe.

Example 13: The method of any one of examples 1 to 12, wherein the first symbol block is transmitted in a first slot, and the second symbol block is transmitted in a second slot.

Example 14: The method of any one of examples 1 to 13, wherein the first symbol block is transmitted by a first user equipment (UE) and the second symbol block is transmitted by a second UE.

Example 15: The method of any one of examples 1 to 13, wherein the first symbol block and the second symbol block are transmitted by a same UE.

Example 16: The method of any one of examples 1 to 15, further comprising obtaining control information indicating at least one of: a time duration of the first CP; a time duration of the second CP; a time duration of the first data duration; a time duration of the second data duration; a subframe length; a subframe location; a slot length; a slot location; a switching gap length; a switching gap location.

Example 17: The method of example 16, wherein obtaining the control information comprises: receiving encoded control information in a downlink portion of the frame, and decoding the encoded control information to obtain the control information.

Example 18: The method of any one of examples 1 to 13, wherein the first symbol block and the second symbol block are transmitted by a base station.

Example 19: The method of example 18, further comprising transmitting control information indicating at least one of: a time duration of the first CP; a time duration of the second CP; a time duration of the first data duration; a time duration of the second data duration; a subframe length; a subframe location; a slot length; a slot location; a switching gap length; a switching gap location.

Example 20: The method of example 1, wherein the first symbol block and the second symbol block are transmitted in different frames.

Example 21: An apparatus configured to perform the method of any one of examples 1 to 20.

Example 22: An apparatus comprising a processor and a memory; the memory including processor-executable instruction that, when executed by the processor, cause the processor to control the apparatus to perform the method of any one of examples 1 to 20.

Example 23: An apparatus comprising: a processor to generate a first symbol block having a first CP and a first data portion, and a second symbol block having a second CP and a second data portion; a transmitter to transmit the first symbol block and the second symbol block; wherein the first symbol block has a first time duration, and wherein the second symbol block has a second time duration that is different from the first time duration.

Example 24: The apparatus of any one of examples 21 to 23, wherein the apparatus is a UE or a base station.

Example 25: A method of transmitting in a wireless communication system, the method comprising: generating a first set of data symbols on a same single carrier frequency, generating a first CP using at least one data symbol of the first set of data symbols, and appending the first set of data symbols to the first CP to generate a single-carrier symbol block; generating a second set of data symbols, each data symbol of the second set of data symbols on a respective different carrier frequency, operating on the second set of data symbols using an inverse discrete fourier transform to obtain a data portion, and appending the data portion to a second CP to generate a multi-carrier symbol block; transmitting the single-carrier symbol block and the multi-carrier symbol block.

Example 26: The method of example 25, wherein the single-carrier symbol block and the multi-carrier symbol block are transmitted in a same frame.

Example 27: The method of example 26, wherein the single-carrier symbol block and the multi-carrier symbol block are transmitted in different subframes and/or in different slots.

Example 28: The method of any one of examples 25 to 27, wherein the single-carrier symbol block has a first time duration, and wherein the multi-carrier symbol block has a second time duration that is different from the first time duration.

Example 29: The method of example 28, wherein the first CP has a different length than the second CP.

Example 30: The method of any one of examples 25 to 29, wherein the multi-carrier symbol block is an OFDM symbol.

Example 31: The method of any one of examples 25 to 30, wherein the frame includes an uplink portion and a downlink portion, and wherein the single-carrier symbol block and the multi-carrier symbol block are both transmitted in either the uplink portion or the downlink portion.

Example 32: The method of example 31, wherein a configurable switching gap exists between the uplink portion and the downlink portion.

Example 33: The method of example 32, wherein the configurable switching gap has a duration in time that is not a function of symbol length or symbol block length.

Example 34: The method of example 32 or example 33, wherein the single-carrier symbol block and the multi-carrier symbol block are transmitted over a first bandwidth, wherein the method further comprises transmitting and receiving other symbol blocks over a second bandwidth, and wherein the configurable switching gap is at a same time location and aligned in time in both the first bandwidth and the second bandwidth.

Example 35: The method of any one of examples 25 to 34, wherein the single-carrier symbol block is transmitted by a first UE and the multi-carrier symbol block is transmitted by a second UE.

Example 36: The method of any one of examples 25 to 34, wherein the single-carrier symbol block and the multi-carrier symbol block are transmitted by a same UE.

Example 37: The method of example 36, further comprising obtaining control information indicating at least one of: a time duration of the first CP; a time duration of the second CP; a number of data symbols in the first set of data symbols; a time duration of the first set of data symbols; a time duration of the data duration; a subframe length; a subframe location; a slot length; a slot location; a switching gap length; a switching gap location.

Example 38: The method of any one of examples 25 to 34, wherein the single-carrier symbol block and the multi-carrier symbol block are transmitted by a base station.

Example 39: The method of example 38, further comprising transmitting control information indicating at least one of: a time duration of the first CP; a time duration of the second CP; a number of data symbols in the first set of data symbols; a time duration of the first set of data symbols; a time duration of the data duration; a subframe length; a subframe location; a slot length; a slot location; a switching gap length; a switching gap location.

Example 40: An apparatus configured to perform the method of any one of examples 25 to 39.

Example 41: An apparatus comprising a processor and a memory; the memory including processor-executable instruction that, when executed by the processor, cause the processor to control the apparatus to perform the method of any one of examples 25 to 39.

Example 42: An apparatus comprising: a processor to: generate a first set of data symbols on a same single carrier frequency, generate a first CP using at least one data symbol of the first set of data symbols, and append the first set of data symbols to the first CP to generate a single-carrier symbol block; generate a second set of data symbols, each data symbol of the second set of data symbols on a respective different carrier frequency, operate on the second set of data symbols using an inverse discrete fourier transform to obtain a data portion, and append the data portion to a second CP to generate a multi-carrier symbol block; a transmitter to transmit the single-carrier symbol block and the multi-carrier symbol block.

Example 43: The apparatus of any one of examples 40 to 42, wherein the apparatus is a UE or a base station.

Example 44: A method of transmitting in a wireless communication system, the method comprising: transmitting a first symbol block in a first subframe having a first subframe duration; and transmitting a second symbol block in second subframe having a second subframe duration; wherein the first subframe duration is different from the second subframe duration.

Example 45: The method of example 44, wherein the first subframe and the second subframe are in different frames.

Example 46: The method of example 44, wherein the first subframe and the second subframe are in the same frame.

Example 47: The method of any one of examples 44 to 46, further comprising obtaining control information indicating at least one of: the first subframe duration; the first subframe location; the second subframe duration; the second subframe location.

Example 48: The method of example 47, wherein the method is performed by a UE, and wherein obtaining the control information comprises: receiving encoded control information in a downlink portion of one or more frames, and decoding the encoded control information to obtain the control information.

Example 49: The method of any one of examples 44 to 48, wherein the first symbol block has a first CP and a first data portion, wherein the second symbol block has a second CP and a second data portion, wherein the first symbol block has a first time duration, wherein the second symbol block has a second time duration, and optionally wherein the first time duration is different from the second time duration.

Example 50: The method of example 49, wherein the first symbol block is a single-carrier symbol block and the second symbol block is a multi-carrier symbol block.

Example 51: An apparatus configured to perform the method of any one of examples 44 to 50.

Example 52: An apparatus comprising a processor and a memory; the memory including processor-executable instruction that, when executed by the processor, cause the processor to control the apparatus to perform the method of any one of examples 44 to 50.

Example 53: An apparatus comprising: a processor to generate a first symbol block and a second symbol block; a transmitter to transmit the first symbol block in a first subframe having a first subframe duration, and to transmit the second symbol block in a second subframe having a second subframe duration.

Example 54: The apparatus of any one of examples 51 to 53, wherein the apparatus is a UE or a base station.

Example 55: A method of transmitting in a wireless communication system, the method comprising: transmitting a first data symbol in a first slot having a first slot duration; and transmitting a second data symbol in second slot having a second slot duration; wherein the first slot duration is different from the second slot duration.

Example 56: The method of example 55, wherein the first slot and second slot may be in a same frame or in a different frame, and optionally wherein control information is obtained indicating at least one of: the first slot duration; the first slot length; the second slot duration; the second slot length.

Example 57: A method for wireless communication comprising: transmitting a first symbol block having a first CP and a first data portion; receiving a second symbol block having a second CP and a second data portion; wherein the first symbol block has a first time duration, and wherein the second symbol block has a second time duration that is different from the first time duration.

Example 58: The method of example 57, wherein the first symbol block is transmitted and the second symbol block is received in a same single frame.

Example 59: A method for wireless communication comprising: transmitting a first symbol block in a first subframe having a first subframe duration; and receiving a second symbol block in second subframe having a second subframe duration; wherein the first subframe duration is different from the second subframe duration.

Example 60: The method of example 59, wherein the first subframe and the second subframe are in a single same frame.

Example 61: The method of example 59 or example 60, wherein control information indicates at least one of: the first subframe duration; the first subframe location; the second subframe duration; the second subframe location.

Example 62: A method for wireless communication comprising: transmitting a first symbol block in a first slot having a first slot duration; and receiving a second symbol block in second slot having a second slot duration; wherein the first slot duration is different from the second slot duration.

Example 63: The method of example 62, wherein the first slot and the second slot are in a single same frame, and optionally also within a single same subframe.

Example 64: The method of example 62 or example 63, wherein control information indicates at least one of: the first slot duration; the first slot location; the second slot duration; the second slot location.

Example 65: A method for wireless communication comprising: generating a first set of data symbols, each data symbol of the first set of data symbols on a respective different carrier frequency, operating on the first set of data symbols using a first inverse discrete fourier transform (IDFT) to obtain a first data portion, and appending the first data portion to a first CP to obtain a first OFDM symbol; transmitting the first OFDM symbol; generating a second set of data symbols, each data symbol of the second set of data symbols on a respective different carrier frequency, operating on the second set of data symbols using a second IDFT to obtain a second data portion, and appending the second data portion to a second CP to obtain a second OFDM symbol; transmitting the second OFDM symbol; wherein the first IDFT has a first size, wherein the second IDFT has a second size different from the first size, and wherein the first size and/or the second size is not a power of two.

Example 66: The method of example 65, wherein the first IDFT and/or the second IDFT is not an IFFT.

Example 67: The method of example 65 or example 66, wherein the first OFDM symbol has a first time duration, the second OFDM symbol has a second time duration that is different from the first time duration, the first time duration is not a multiple of two of the second time duration, and the second time duration is not a multiple of two of the first time duration.

Example 68: The method of any one of examples 65 to 67, wherein the first OFDM symbol and the second OFDM symbol are transmitted in a same frame.

Example 69: The method of example 68, wherein the first OFDM symbol is transmitted in one subframe and/or one slot in the frame, and the second OFDM symbol is transmitted in another subframe and/or another slot in the frame.

Example 70: A method performed by a user equipment (UE), the method comprising: decoding control information in a frame, the control information indicating at least one of: frame length of the frame; subframe length; slot length; symbol block length; CP length; whether a symbol block is single-carrier waveform or a multi-carrier waveform; switching gap length; switching gap location; transmitting or receiving symbol blocks in the frame according to the control information.

Example 71: The method of example 70, wherein the control information is in a broadcast channel.

Example 72: The method of example 70, wherein decoding the control information comprises: decoding a broadcast channel in the frame to obtain first information; using the first information to determine a time-frequency resource in the frame at which second information is located; decoding the second information at the time-frequency resource to obtain the control information.

Example 73: The method of example 70, wherein the control information is in a common control channel.

Example 74: The method of example 70, wherein the control information is downlink control information (DCI) and/or radio resource control (RRC) signaling.

Example 75: The method of example 74, wherein the RRC signaling indicates possible options for subframe length and/or slot length, and the DCI indicates which particular subframe length and/or which particular slot length is configured for the frame.

Example 76: An apparatus configured to perform the method of any one of examples 65 to 75.

CONCLUSION

A flexible frame structure is disclosed herein. In some embodiments, the frame structure is flexible enough that certain boundaries do not need to be strictly followed, e.g. just the transmission duration (e.g. symbol block duration) and direction (uplink or downlink) may only be defined. Possible benefits of some embodiments of the flexible frame structure include: flexibility to possibly fit different transmission conditions and meet different service/quality requirements; possibly better spectrum efficiency due to more efficient utilization of time-frequency resources; not limited by smallest time duration granularity (e.g. the downlink/uplink switching gap or the time duration used for AGC measurement does not have to be the integer of a predefined symbol length). These benefits offset any potential increases in computational complexity and/or signaling overhead.

Finally, although the description above discusses a flexible frame structure in the context of communications between UEs and base stations, i.e. downlink and uplink, a same flexible frame structure may be used for sidelink communications, i.e. UE-to-UE communications, sometimes referred to as device-to-device (D2D) communications. That is, a frame may be used for a transmission from one UE to the other UE, and the frame may have the flexible frame structure according to any of the embodiments described above.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method for wireless communication comprising:
   transmitting an indication of a first size for a first inverse discrete Fourier transform (IDFT) operation and an indication of a second size for a second IDFT operation;
   modulating a first set of parallel bit streams to obtain a first set of data symbols, each data symbol of the first set of data symbols for transmission on a respective subcarrier of a first plurality of subcarriers;
   transmitting a first orthogonal frequency division multiplexing (OFDM) symbol over a wireless channel on the first plurality of subcarriers, the first OFDM symbol comprising a first data portion generated from the first IDFT operation of the first set of data symbols, the first OFDM symbol having a first OFDM symbol duration corresponding to the first size of the first IDFT operation;
   modulating a second set of parallel bit streams to obtain a second set of data symbols, each data symbol of the second set of data symbols for transmission on a respective subcarrier of a second plurality of subcarriers; and
   transmitting a second OFDM symbol over the wireless channel on the second plurality of subcarriers, the second OFDM symbol comprising a second data portion generated from a second IDFT operation of the second set of data symbols, the second OFDM symbol having a second OFDM symbol duration different from the first OFDM symbol duration, the second OFDM symbol duration corresponding to the second size of the second IDFT operation;
   wherein the second size is different from the first size, and wherein at least one of the first size and the second size is not a power of two and is based on multiplied powers of prime numbers.

2. The method of claim 1, further comprising:
   generating, with the first IDFT operation of the first size, the first data portion from the first set of data symbols; and
   generating, with the second IDFT operation of the second size, the second data portion from the second set of data symbols.

3. The method of claim 1, wherein each data symbol of the first set of data symbols is on a respective different subcarrier of the first plurality of subcarriers, the first plurality of subcarriers each having a respective different subcarrier frequency, and wherein each data symbol of the second set of data symbols is on a respective different subcarrier of the second plurality of subcarriers, the second plurality of subcarriers each having a respective different subcarrier frequency.

4. The method of claim 1, wherein the first OFDM symbol and the second OFDM symbol are transmitted in a same frame.

5. The method of claim 1, wherein the first OFDM symbol further comprises a first cyclic prefix (CP) and the second OFDM symbol further comprises a second CP, and the method further comprises transmitting an indication of the length of the first CP and an indication of the length of the second CP.

6. An apparatus comprising:
   a memory to store processor-executable instructions;
   a processor that, upon execution of the instructions, causes the processor to:
   output an indication of a first size for a first inverse discrete Fourier transform (IDFT) operation and an indication of a second size for a second IDFT operation;
   modulate a first set of parallel bit streams to obtain a first set of data symbols, each data symbol of the first set of data symbols for transmission on a respective subcarrier of a first plurality of subcarriers;
   output a first orthogonal frequency division multiplexing (OFDM) symbol for transmission over a wireless channel on the first plurality of subcarriers, the first OFDM symbol comprising a first data portion generated from the first IDFT operation of the first set of data symbols, the first OFDM symbol having a first OFDM symbol duration corresponding to the first size of the first IDFT operation;
   modulate a second set of parallel bit streams to obtain a second set of data symbols, each data symbol of the second set of data symbols for transmission on a respective subcarrier of a second plurality of subcarriers; and
   output a second OFDM symbol for transmission over the wireless channel on the second plurality of subcarriers, the second OFDM symbol comprising a second data portion generated from a second IDFT operation of the second set of data symbols, the second OFDM symbol having a second OFDM symbol duration different from the first OFDM symbol duration, the second OFDM symbol duration corresponding to the second size of the second IDFT operation;
   wherein the second size is different from the first size, and wherein at least one of the first size and the second size is not a power of two and is based on multiplied powers of prime numbers.

7. The apparatus of claim 6, wherein upon execution of the instructions, the processor is to:
   generate, with the first IDFT operation of the first size, the first data portion from the first set of data symbols; and
   generate, with the second IDFT operation of the second size, the second data portion from the second set of data symbols.

8. The apparatus of claim 6, wherein each data symbol of the first set of data symbols is on a respective different subcarrier of the first plurality of subcarriers, the first plurality of subcarriers each having a respective different subcarrier frequency; and wherein each data symbol of the second set of data symbols is on a respective different subcarrier of the second plurality of subcarriers, the second plurality of subcarriers each having a respective different subcarrier frequency.

9. The apparatus of claim 6, wherein the first OFDM symbol and the second OFDM symbol are for transmission in a same frame.

10. The apparatus of claim 6, wherein the first OFDM symbol further comprises a first cyclic prefix (CP) and the second OFDM symbol further comprises a second CP, and wherein upon execution of the instructions the processor is to output an indication of the length of the first CP and an indication of the length of the second CP.

11. A method for wireless communication comprising:
- receiving an indication of a first size for a first inverse discrete Fourier transform (IDFT) operation and an indication of a second size for a second IDFT operation;
- modulating a first set of parallel bit streams to obtain a first set of data symbols, each data symbol of the first set of data symbols for transmission on a respective subcarrier of a first plurality of subcarriers;
- transmitting a first orthogonal frequency division multiplexing (OFDM) symbol over a wireless channel on the first plurality of subcarriers, the first OFDM symbol comprising a first data portion generated from the first IDFT operation of the first set of data symbols, the first OFDM symbol having a first OFDM symbol duration corresponding to the first size of the first IDFT operation;
- modulating a second set of parallel bit streams to obtain a second set of data symbols, each data symbol of the second set of data symbols for transmission on a respective subcarrier of a second plurality of subcarriers; and
- transmitting a second OFDM symbol over the wireless channel on the second plurality of subcarriers, the second OFDM symbol comprising a second data portion generated from a second IDFT operation of the second set of data symbols, the second OFDM symbol having a second OFDM symbol duration different from the first OFDM symbol duration, the second OFDM symbol duration corresponding to the second size of the second IDFT operation;
- wherein the second size is different from the first size, and wherein at least one of the first size and the second size is not a power of two and is based on multiplied powers of prime numbers.

12. The method of claim 11, wherein receiving the indication of the first size and the indication of the second size comprises: receiving encoded control information in a downlink portion of a frame, and decoding the encoded control information to obtain an indication of a time duration of the first data portion and an indication of a time duration of the second data portion.

13. The method of claim 11, further comprising:
- generating, with the first IDFT operation of the first size, the first data portion from the first set of data symbols; and
- generating, with the second IDFT operation of the second size, the second data portion from the second set of data symbols.

14. The method of claim 11, wherein each data symbol of the first set of data symbols is on a respective different subcarrier of the first plurality of subcarriers, the first plurality of subcarriers each having a respective different subcarrier frequency, and wherein each data symbol of the second set of data symbols is on a respective different subcarrier of the second plurality of subcarriers, the second plurality of subcarriers each having a respective different subcarrier frequency.

15. The method of claim 11, wherein the first OFDM symbol and the second OFDM symbol are transmitted in a same frame.

16. The method of claim 11, wherein the first OFDM symbol further comprises a first cyclic prefix (CP) and the second OFDM symbol further comprises a second CP, and the method further comprises receiving an indication of the length of the first CP and an indication of the length of the second CP.

17. An apparatus comprising:
- a memory to store processor-executable instructions;
- a processor that, upon execution of the instructions, causes the processor to:
  - receive an indication of a first size for a first inverse discrete Fourier transform (IDFT) operation and an indication of a second size for a second IDFT operation;
  - modulate a first set of parallel bit streams to obtain a first set of data symbols, each data symbol of the first set of data symbols for transmission on a respective subcarrier of a first plurality of subcarriers;
  - output a first orthogonal frequency division multiplexing (OFDM) symbol for transmission over a wireless channel on the first plurality of subcarriers, the first OFDM symbol comprising a first data portion generated from the first IDFT operation of the first set of data symbols, the first OFDM symbol having a first OFDM symbol duration corresponding to the first size of the first IDFT operation;
  - modulate a second set of parallel bit streams to obtain a second set of data symbols, each data symbol of the second set of data symbols for transmission on a respective subcarrier of a second plurality of subcarriers; and
  - output a second OFDM symbol for transmission over the wireless channel on the second plurality of subcarriers, the second OFDM symbol comprising a second data portion generated from a second IDFT operation of the second set of data symbols, the second OFDM symbol having a second OFDM symbol duration different from the first OFDM symbol duration, the second OFDM symbol duration corresponding to the second size of the second IDFT operation;
  - wherein the second size is different from the first size, and wherein at least one of the first size and the second size is not a power of two and is based on multiplied powers of prime numbers.

18. The apparatus of claim 17, wherein upon execution of the instructions, the processor is to receive the indication of the first size and the indication of the second size by performing operations comprising: receiving encoded control information in a downlink portion of a frame, and decoding the encoded control information to obtain an indication of a time duration of the first data portion and an indication of a time duration of the second data portion.

19. The apparatus of claim 17, wherein upon execution of the instructions, the processor is to:
- generate, with the first IDFT operation of the first size, the first data portion from the first set of data symbols; and
- generate, with the second IDFT operation of the second size, the second data portion from the second set of data symbols.

20. The apparatus of claim 17, wherein each data symbol of the first set of data symbols is on a respective different subcarrier of the first plurality of subcarriers, the first plurality of subcarriers each having a respective different subcarrier frequency; and wherein each data symbol of the second set of data symbols is on a respective different subcarrier of the second plurality of subcarriers, the second plurality of subcarriers each having a respective different subcarrier frequency.

21. The apparatus of claim 17, wherein the first OFDM symbol and the second OFDM symbol are for transmission in a same frame.

22. The apparatus of claim 17, wherein the first OFDM symbol further comprises a first cyclic prefix (CP) and the second OFDM symbol further comprises a second CP, and wherein the processor is to receive an indication of the length of the first CP and an indication of the length of the second CP.

\* \* \* \* \*